US012696134B2

(12) United States Patent
Sharma et al.

(10) Patent No.: US 12,696,134 B2
(45) Date of Patent: Jul. 28, 2026

(54) COMMUNICATIONS DEVICE, INFRASTRUCTURE EQUIPMENT AND METHODS

(71) Applicant: Sony Group Corporation, Tokyo (JP)

(72) Inventors: Vivek Sharma, Basingstoke (GB); Yuxin Wei, Basingstoke (GB); Hideji Wakabayashi, Basingstoke (GB); Yassin Aden Awad, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 555 days.

(21) Appl. No.: 17/614,553

(22) PCT Filed: May 6, 2020

(86) PCT No.: PCT/EP2020/062615
§ 371 (c)(1),
(2) Date: Nov. 29, 2021

(87) PCT Pub. No.: WO2020/249324
PCT Pub. Date: Dec. 17, 2020

(65) Prior Publication Data
US 2022/0225163 A1 Jul. 14, 2022

(30) Foreign Application Priority Data
Jun. 12, 2019 (EP) ..................................... 19179816

(51) Int. Cl.
*H04W 28/06* (2009.01)
*H04L 1/1607* (2023.01)
(Continued)

(52) U.S. Cl.
CPC ........... *H04W 28/06* (2013.01); *H04L 1/1642* (2013.01); *H04L 5/0053* (2013.01); *H04W 80/06* (2013.01)

(58) Field of Classification Search
CPC ....... H04W 28/06; H04W 80/06; H04W 4/80; H04W 4/70; H04L 1/1642; H04L 5/0053;
(Continued)

(56) References Cited

U.S. PATENT DOCUMENTS

2011/0194490 A1    8/2011  Gandham et al.
2015/0009999 A1*   1/2015  Oguchi ................... H04L 67/56
                                                         370/392
(Continued)

FOREIGN PATENT DOCUMENTS

EP          3151608 A1 *  4/2017  ........... H04L 1/1896
WO    WO-2019166108 A1 *  9/2019  ........... H04L 69/163

OTHER PUBLICATIONS

International Search Report and Written Opinion mailed on Aug. 17, 2020, received for PCT Application PCT/EP2020/062615, Filed on May 6, 2020, 12 pages.
(Continued)

*Primary Examiner* — Joseph E Avellino
*Assistant Examiner* — Adam Joel Cerlanek
(74) *Attorney, Agent, or Firm* — XSENSUS, LLP

(57) ABSTRACT

A method of receiving downlink data associated with an end-to-end connection between a communications device and an endpoint by an access stratum infrastructure equipment in a wireless communications network, the wireless communications network comprising a core network, the access stratum infrastructure equipment and another access stratum infrastructure equipment, the access stratum infrastructure equipment connected to the core network and to the other access stratum infrastructure equipment, the other access stratum infrastructure equipment providing a wireless access interface, wherein the wireless access interface is for the transmission of data to and the reception of data from the
(Continued)

communications device and the downlink data is for transmission to the communications device.

16 Claims, 8 Drawing Sheets

(51) Int. Cl.
H04L 5/00 (2006.01)
H04W 80/06 (2009.01)
(58) Field of Classification Search
CPC ....... H04L 47/34; H04L 41/142; H04L 41/40;
H04L 43/0864; H04L 43/16; H04L 43/20;
H04L 67/125; H04L 69/163; H04L 69/22;
H04L 1/1809
See application file for complete search history.

(56) References Cited

U.S. PATENT DOCUMENTS

2015/0117276 A1*  4/2015  Hu ........................ H04L 1/1861
370/280
2019/0037463 A1*  1/2019  Feng ..................... H04W 36/38
2020/0100271 A1*  3/2020  Fang ..................... H04W 4/80
2022/0279453 A1*  9/2022  Dinan ................. H04W 52/367

OTHER PUBLICATIONS

Braden., "Requirements for Internet Hosts—Communication Layers", RFC 1122, Oct. 1989, pp. 1-69.
NTT Docomo, Inc., et al., "Potential hurdle in maximising DL TCP throughput", 3GPP TSG-RAN WG2 #97bis, R2-1703311, Apr. 3-7, 2017, 3 pages.
"Transmission Control Program", RFC793, Darpa Internet Program, Sep. 1981, pp. 1-175.
LG Electronics Inc., "Prioritizing TCP ACK transmission", 3GPP TSG-RAN WG2 #97bis, R2-1703514, Apr. 3-7, 2017, 3 pages.
Holma et al., "LTE for UMTS OFDMA and SC-FDMA based radio access", John Wiley and Sons, 2009, 232 pages.
Nokia et al., "Revised SID: Study on NR Industrial Internet of Things (IoT)", 3GPP TSG RAN meeting #81, RP-182090, Sep. 10-13, 2018, 5 pages.
3GPP, "Medium Access Control (MAC) protocol specification (Release 15)", 3GPP TS 38.321 V15.3.0, Sep. 2018, 76 pages.

* cited by examiner

COMMUNICATIONS DEVICE, INFRASTRUCTURE EQUIPMENT AND METHODS

CROSS-REFERENCE TO RELATED APPLICATIONS

The present application is based on PCT filing PCT/EP2020/062615, filed May 6, 2020, which claims priority to EP 19179816.4, filed Jun. 12, 2019, the entire contents of each are incorporated herein by reference.

BACKGROUND

Field

The present disclosure relates to communications devices, infrastructure equipment and methods for the transmission of data associated with an end-to-end connection in a wireless communications network.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to support communications routinely and efficiently with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

In view of this there is expected to be a desire for future wireless communications networks, for example those which may be referred to as 5G or new radio (NR) system/new radio access technology (RAT) systems [1], as well as future iterations/releases of existing systems, to efficiently support connectivity for a wide range of devices associated with different applications and different characteristic data traffic profiles.

Some new services may generate data traffic which is asymmetric—that is, where an amount of data generated for transmission in one direction (for example, in an uplink direction, where uplink data is transmitted from a communications device to an infrastructure equipment) is significantly greater than that generated for transmission in the opposite direction (for example in a downlink direction from an infrastructure equipment to a communications device). In some cases, the quantity of data in one direction may be substantially zero. Some such services may nevertheless require reliable and in-order data transmission, which can be achieved by means of an end-to-end protocol which generates acknowledgements which are transmitted to the sender of the data.

The increasing use of different services gives rise to new challenges for efficiently handling communications in wireless telecommunications systems that need to be addressed.

SUMMARY

The present disclosure can help address or mitigate at least some of the issues discussed above.

Embodiments of the present technique can provide a method of receiving downlink data associated with an end-to-end connection between a communications device and an endpoint by an access stratum infrastructure equipment in a wireless communications network, the wireless communications network comprising a core network, the access stratum infrastructure equipment and another access stratum infrastructure equipment, the access stratum infrastructure equipment connected to the core network and to the other access stratum infrastructure equipment, the other access stratum infrastructure equipment providing a wireless access interface, wherein the wireless access interface is for the transmission of data to and the reception of data from the communications device and the downlink data is for transmission to the communications device, the method comprising: receiving the downlink data from the core network, determining that the downlink data comprises a positive acknowledgement indication generated in accordance with an end-to-end protocol providing reliable, in-order delivery of data, the positive acknowledgement indication indicating that uplink data associated with the end-to-end connection transmitted by the communications device has been successfully received at the endpoint, and in response to determining that the downlink data comprises the positive acknowledgement indication, discarding the downlink data.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and.

DETAILED DESCRIPTION OF THE EMBODIMENTS

Long Term Evolution Advanced Radio Access Technology (4G)

Figure 1:
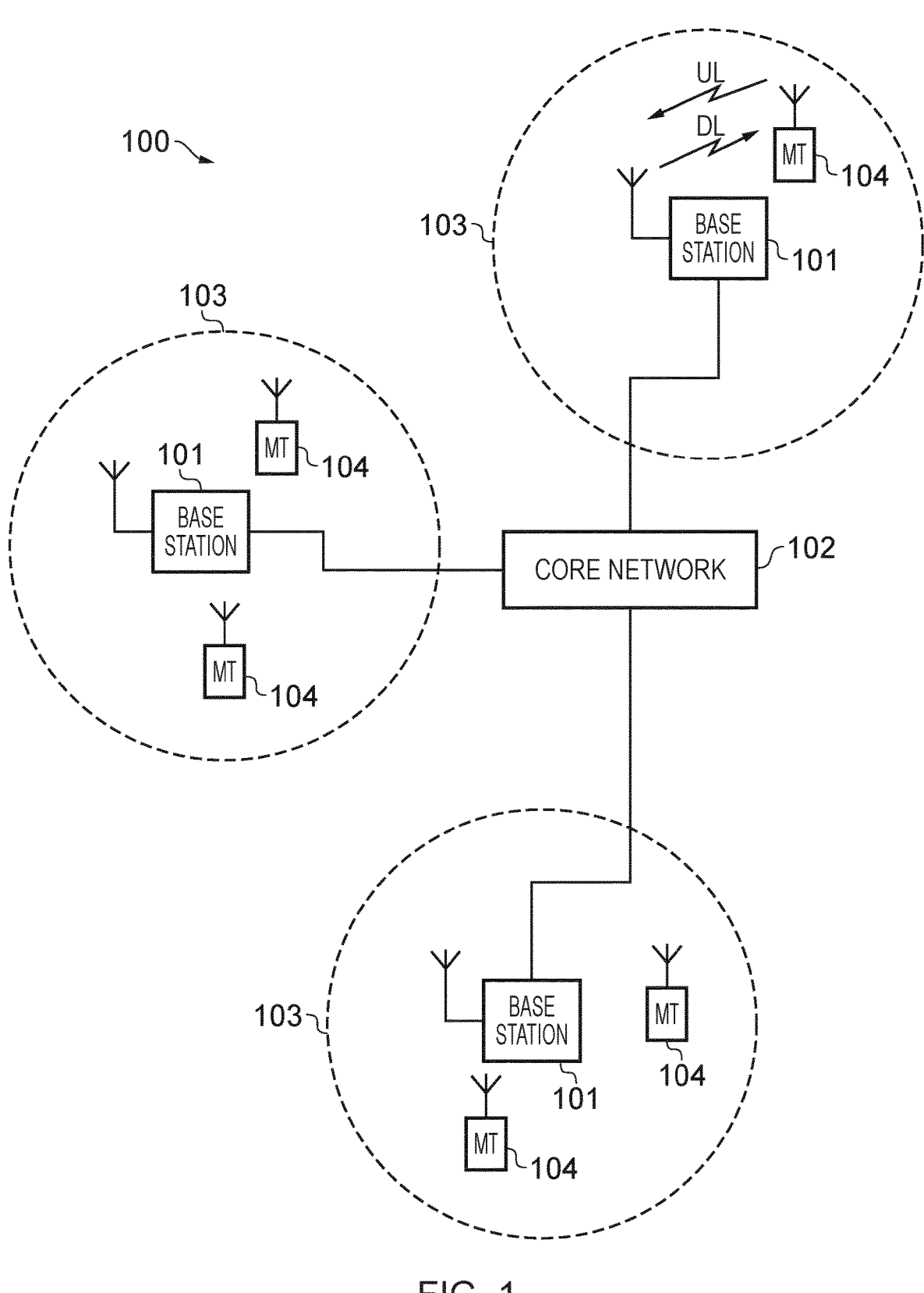
FIG. 1 schematically represents some aspects of an LTE-type wireless telecommunication system which may be configured to operate in accordance with certain embodiments of the present disclosure.

FIG. 1 provides a schematic diagram illustrating some basic functionality of a mobile telecommunications network/system 100 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP® body, and also described in many books on the subject, for example, Holma H. and Toskala A [2]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 100 includes a plurality of base stations 101 connected to a core network part 102. Each base station provides a coverage area 103 (e.g. a cell) within which data can be communicated to and from communications devices 104. Data is transmitted from the base stations 101 to the communications devices 104 within their respective coverage areas 103 via a radio downlink Data is transmitted from the communications devices 104 to the base stations 101 via a radio uplink. The core network part 102 routes data to and from the communications devices 104 via the respective base stations 101 and provides functions such as authentication, mobility management, charging and so on. Communications devices may also be referred to as mobile stations, user equipment (UE), user terminals, mobile radios, terminal devices, and so forth. Base stations, which are an example of network infrastructure equipment/network access nodes, may also be referred to as transceiver stations/nodeBs/e-nodeBs, g-nodeBs (gNB) and so forth. In this regard different terminology is often associated with different generations of wireless telecommunications systems for elements providing broadly comparable functionality. However, example embodiments of the disclosure may be equally implemented in different generations of wireless telecommunications systems such as 5G or new radio as explained below, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G)

Figure 2:
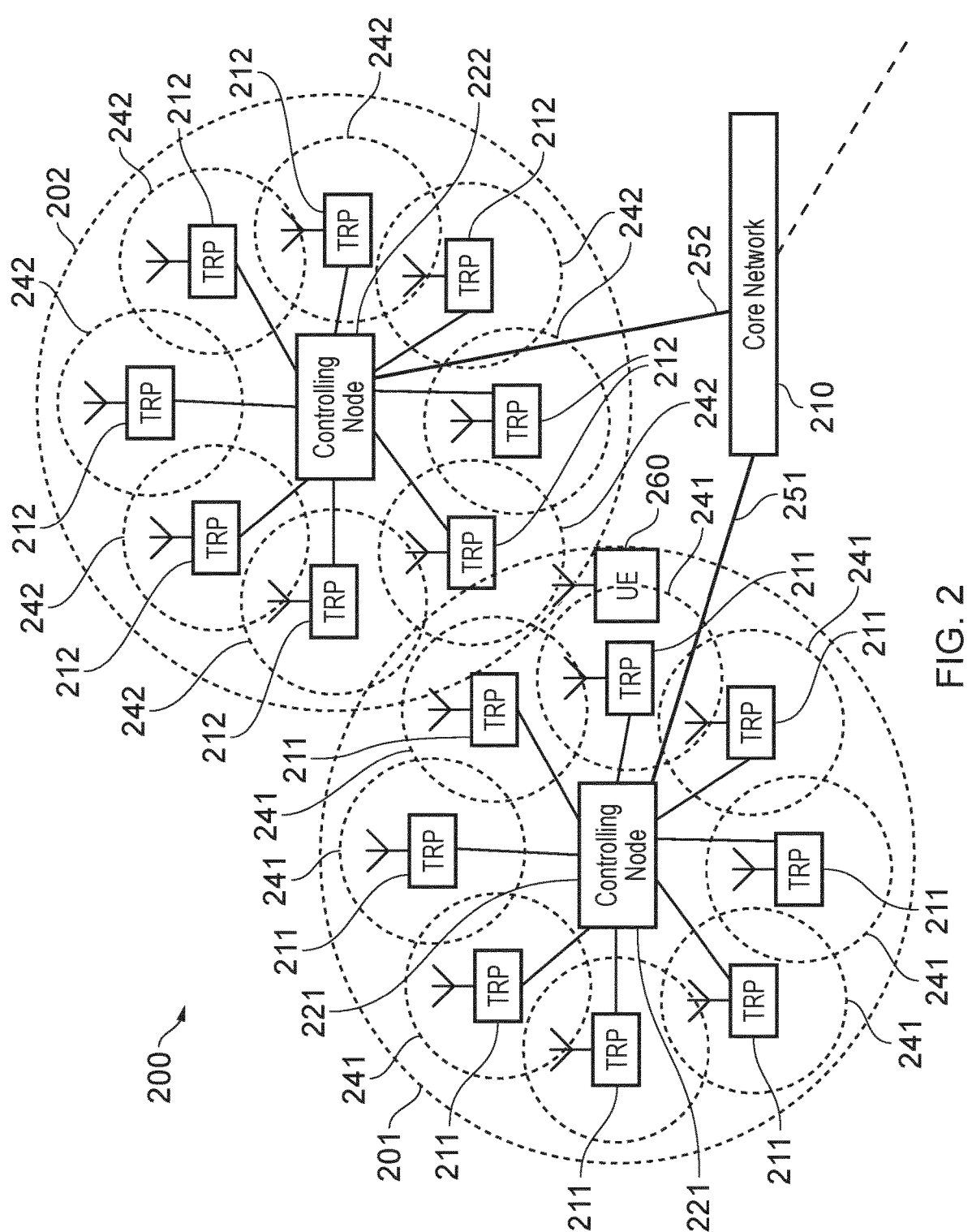
FIG. 2 schematically represents some aspects of a new radio access technology (RAT) wireless telecommunications system which may be configured to operate in accordance with certain embodiments of the present disclosure.

FIG. 2 is a schematic diagram illustrating a network architecture for a new RAT wireless communications network/system 200 based on previously proposed approaches which may also be adapted to provide functionality in accordance with embodiments of the disclosure described herein. The new RAT network 200 represented in FIG. 2 comprises a first communication cell 201 and a second communication cell 202. Each communication cell 201, 202, comprises a controlling node (centralised unit) 221, 222 in communication with a core network component 210 over a respective wired or wireless link 251, 252. The respective controlling nodes 221, 222 are also each in communication with a plurality of distributed units (radio access nodes/remote transmission and reception points (TRPs)) 211, 212 in their respective cells. Again, these communications may be over respective wired or wireless links. The distributed units (DUs) 211, 212 are responsible for providing the radio access interface for communications devices connected to the network. Each distributed unit 211, 212 has a coverage area (radio access footprint) 241, 242 where the sum of the coverage areas of the distributed units under the control of a controlling node together define the coverage of the respective communication cells 201, 202. Each distributed unit 211, 212 includes transceiver circuitry for transmission and reception of wireless signals and processor circuitry configured to control the respective distributed units 211, 212.

In terms of broad top-level functionality, the core network component 210 of the new RAT communications network represented in FIG. 2 may be broadly considered to correspond with the core network 102 represented in FIG. 1, and the respective controlling nodes 221, 222 and their associated distributed units/TRPs 211, 212 may be broadly considered to provide functionality corresponding to the base stations 101 of FIG. 1. The term network infrastructure equipment/access node may be used to encompass these elements and more conventional base station type elements of wireless communications systems. Depending on the application at hand the responsibility for scheduling transmissions which are scheduled on the radio interface between the respective distributed units and the communications devices may lie with the controlling node/centralised unit and/or the distributed units/TRPs.

A communications device or UE 260 is represented in FIG. 2 within the coverage area of the first communication cell 201. This communications device 260 may thus exchange signalling with the first controlling node 221 in the first communication cell via one of the distributed units 211 associated with the first communication cell 201. In some cases communications for a given communications device are routed through only one of the distributed units, but it will be appreciated in some other implementations communications associated with a given communications device may be routed through more than one distributed unit, for example in a soft handover scenario and other scenarios.

In the example of FIG. 2, two communication cells 201, 202 and one communications device 260 are shown for simplicity, but it will of course be appreciated that in practice the system may comprise a larger number of communication cells (each supported by a respective controlling node and plurality of distributed units) serving a larger number of communications devices.

It will further be appreciated that FIG. 2 represents merely one example of a proposed architecture for a new RAT communications system in which approaches in accordance with the principles described herein may be adopted, and the functionality disclosed herein may also be applied in respect of wireless communications systems having different architectures.

Thus example embodiments of the disclosure as discussed herein may be implemented in wireless telecommunication systems/networks according to various different architectures, such as the example architectures shown in FIGS. 1 and 2. It will thus be appreciated that the specific wireless communications architecture in any given implementation is not of primary significance to the principles described herein. In this regard, example embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/access node may comprise a base station, such as an LTE-type base station 101 as shown in FIG. 1 which is adapted to provide functionality in accordance with the principles described herein, and in other examples the network infrastructure equipment/access node may comprise a control unit/controlling node 221, 222 and/or a TRP 211, 212 of the kind shown in FIG. 2 which is adapted to provide functionality in accordance with the principles described herein.

Figure 3:
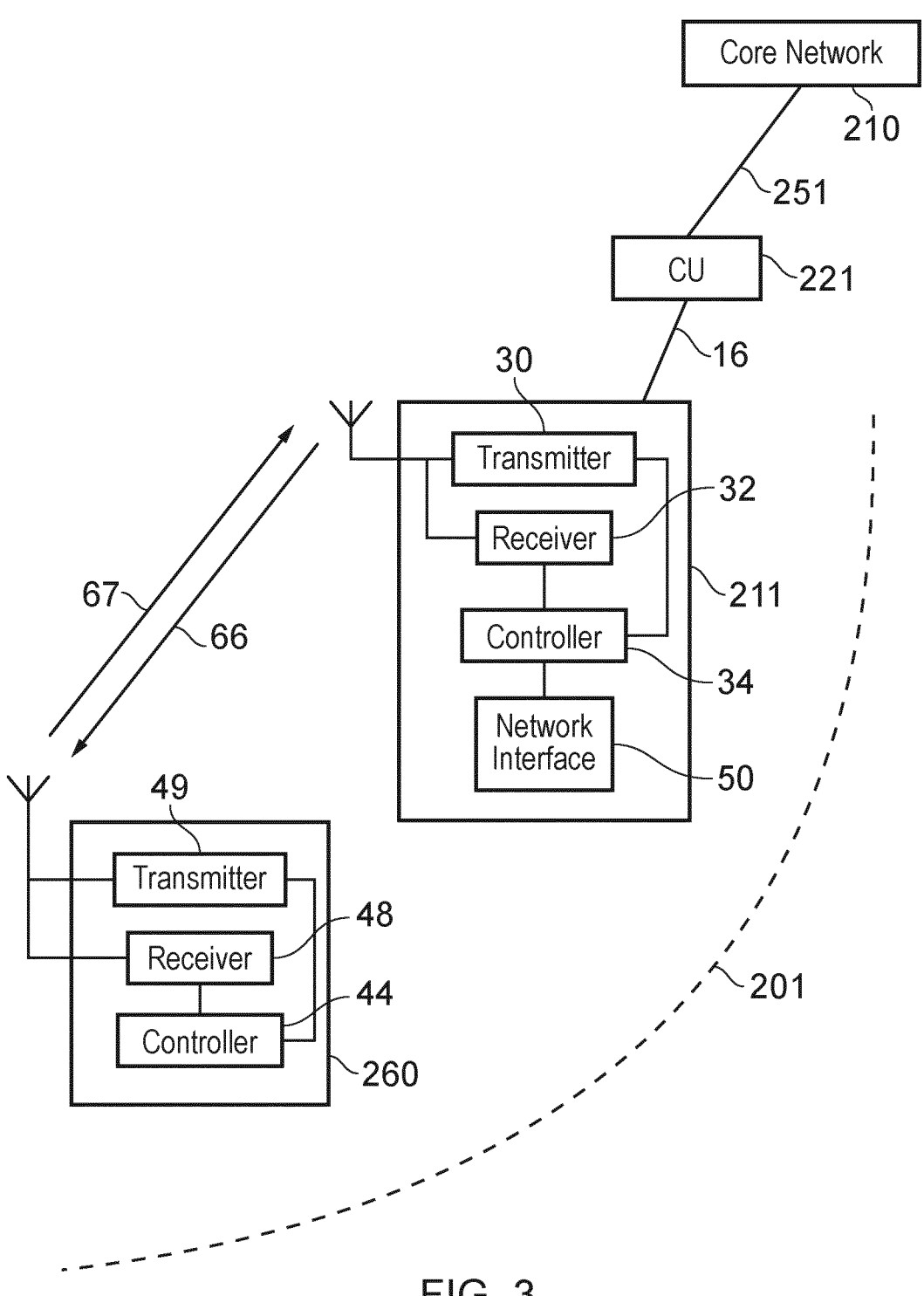
FIG. 3 is a schematic block diagram of an example infrastructure equipment and communications device which may be configured in accordance with example embodiments.

A more detailed diagram of some of the components of the network shown in FIG. 2 is provided by FIG. 3. The DU 211 comprises, as a simplified representation, a transmitter 30, a receiver 32 and a controller or controlling processor 34 which may operate to control the transmitter 30 and the receiver 32 to transmit and receive radio signals to the first communications device 260 within the first cell 201 via a wireless interface comprising an uplink 67 and downlink 66 portion.

The communications device 260 is shown to include a corresponding transmitter 49, a receiver 48 and a controller 44 which is configured to control the transmitter 49 and the receiver 48 to transmit signals representing uplink data to the wireless communications network via the wireless access interface 66, 67.

The communications device 260 operates within the coverage of a cell (such as the first cell 201) of a wireless communications network, using communications resources which may be allocated by the wireless communications network (such as by the DU 211 or the CU 221).

The transmitters 30, 49 and the receivers 32, 48 (as well as other transmitters, receivers and transceivers described in relation to examples and embodiments of the present disclosure) shown in FIG. 3 may include radio frequency filters and amplifiers as well as signal processing components and devices in order to transmit and receive radio signals in accordance for, example, with the 5G/NR standard. The transmitters 30, 49 and the receivers 32, 48 are connected to antennas for transmitting and receiving signals on a wireless access interface.

The controllers 34, 44 (as well as other controllers described in relation to examples and embodiments of the present disclosure) may be, for example, a microprocessor, a CPU, or a dedicated chipset, etc., configured to carry out instructions which are stored on a computer readable medium, such as a non-volatile memory. The processing steps described herein may be carried out by, for example, a microprocessor in conjunction with a random access memory, operating according to instructions stored on a computer readable medium.

The transmitters, receivers and controllers are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the infrastructure equipment 260 will in general comprise various other elements associated with its operating functionality.

As shown in FIG. 3, the DU 211 also includes a network interface 50 which connects to the CU 221 via a physical interface 16. The network interface 50 therefore provides a communication link for data and signalling traffic from the DU 211 via the CU 221 to the core network 210.

Not shown in FIG. 3 are a network interface and controller of the CU 221. The network interface of the CU provides connectivity via interfaces 251, 16 to the core network 210 and DU 211 respectively. The controller of the CU 221 may be, for example, a microprocessor, a CPU, or a dedicated chipset, etc., configured to carry out instructions which are stored on a computer readable medium, such as a non-volatile memory. The processing steps described herein may be carried out by, for example, a microprocessor in conjunction with a random access memory, operating according to instructions stored on a computer readable medium.

5G, URLLC and Industrial Internet of Things

Systems incorporating NR technology are expected to support different services (or types of services), which may be characterised by different requirements for latency, data rate and/or reliability. For example, Enhanced Mobile Broadband (eMBB) services are characterised by high capacity with a requirement to support up to 20 Gb/s. The requirements for Ultra Reliable & Low Latency Communications (URLLC) services are for a reliability of $1\text{-}10^{-5}$ (99.999%) or higher for one transmission of a 32 byte packet with a user plane latency of 1 ms [3]. In some scenarios, there may be a requirement for a reliability of $1\text{-}10^{-6}$ (99.9999%) or higher with either 0.5 ms or 1 ms of user plane latency. Massive Machine Type Communications (mMTC) is another example of a service which may be supported by NR-based communications networks.

In addition, systems may be expected to support further enhancements related to Industrial Internet of Things (IIoT) in order to support services with new requirements of high availability, high reliability, low latency, and in some cases, high-accuracy positioning.

Industrial automation, energy power distribution and intelligent transport systems are examples of new use cases for Industrial Internet of Things (IIoT). In an example of industrial automation, the system may involve different distributed components working together. These components may include sensors, virtualized hardware controllers and autonomous robots, which may be capable of initiating actions or reacting to critical events occurring within a factory and communicating over a local area network.

The UEs in the network may therefore be expected to handle a mixture of different traffic, for example, associated with different applications and potentially different quality of service requirements (such as maximum latency, reliability, packet sizes, throughput). Some messages for transmission may be time sensitive and be associated with strict deadlines and the communications network may therefore be required to provide time sensitive networking (TSN) [6].

URLLC services are required in order to meet the requirements for IIoT, which require high availability, high reliability, low latency, and in some cases, high-accuracy positioning [1]. Some IIoT services may be implemented by using a mixture of eMBB and URLLC techniques, where some data is transmitted by eMBB and other data is transmitted by URLLC.

End-to-End Protocols

Data generated by an application associated with a first device is typically for transmission to a corresponding application in a different device. For example, an application running on a processor of a communications device may generate data for transmission to a peer application running on a processor within a corresponding device. The corresponding device may be for example a server within, or accessible via, the core network.

In order to ensure that such data is received reliably and in order, an end-to-end transmission protocol may be used, such as the Transmission Control Protocol (TCP) [4]. TCP uses sequence numbering associated with transmitted data (referred to herein as TCP data), and acknowledgement mechanisms so that a recipient of data can indicate to the transmitter which data has been successfully received.

Typically, TCP operates in conjunction with a version of the Internet Protocol (IP). Data transmitted using TCP is transmitted with a TCP header. TCP operates in a connection-based approach, where connections are established and maintained between peer entities. Connections permit bi-directional data transfer, so that a TCP header associated with TCP data transmitted in one direction between corresponding devices may include control information (such as acknowledgement information) in respect of TCP data previously transmitted in the opposite direction using the same connection.

However, where no TCP data is available for transmission in the opposite direction, standalone TCP control packets (that is, IP packets containing TCP-related fields, but no TCP data received from an application or protocol higher than TCP) may be generated in accordance with the TCP protocol in order to indicate, for example, the acknowledgement status of previously received TCP data.

TCP headers and TCP control packets may be conventionally treated as 'user data' by lower layer protocols. That is, lower layer protocols may not distinguish between TCP control packets and packets containing TCP data.

Each byte of TCP data is assigned a sequence number (which may be shared among a number of consecutive bytes in some implementations). A TCP header indicates the sequence number of the first byte of TCP data in the packet. The receiver of TCP data acknowledges the receipt of TCP data by transmitting an acknowledgement indication as a TCP control packet or as a TCP header field, comprising an indication of the sequence number of the next expected byte of TCP data.

For example, if TCP data having sequence numbers 4000-4999 is received correctly, and all data earlier in the connection has been correctly received, then the receiver may transmit a TCP acknowledgement (TCP ACK) indicating that sequence number 5000 is the next expected sequence number. The sender of the data thus infers that all data having sequence numbers below 5000 has been correctly received.

If the sender receives multiple TCP ACK indications indicating the same next expected sequence number this is likely an indication that data (including at least the data having the indicated next expected sequence number) has not been received by the receiver but that some data having a higher sequence number has been received.

In some situations, the receiver may transmit a selective acknowledgement indicating one or more ranges of data that has not yet been received. For example if, after receiving data having sequence numbers 4000-4999, the receiver receives data having sequence numbers 6000-6499, and data having sequence numbers 7000-7499 then it may transmit a TCP selective ACK to indicate that data from 5000-5999 and 6500-6999 is missing. This can improve performance since the sender can identify which data has or has not been correctly received.

Any indication that, in accordance with conventional TCP specifications, allows a sender of TCP data to determine that data that has been transmitted has not been successfully received by the intended recipient is referred herein to a negative acknowledgement indication. Note that a negative acknowledgement indication may also be a 'positive' acknowledgement indication, insofar as it indicates that all data up to the next expected sequence number has been successfully received. A TCP selective ACK is an example of a negative acknowledgement indication.

Figure 4:
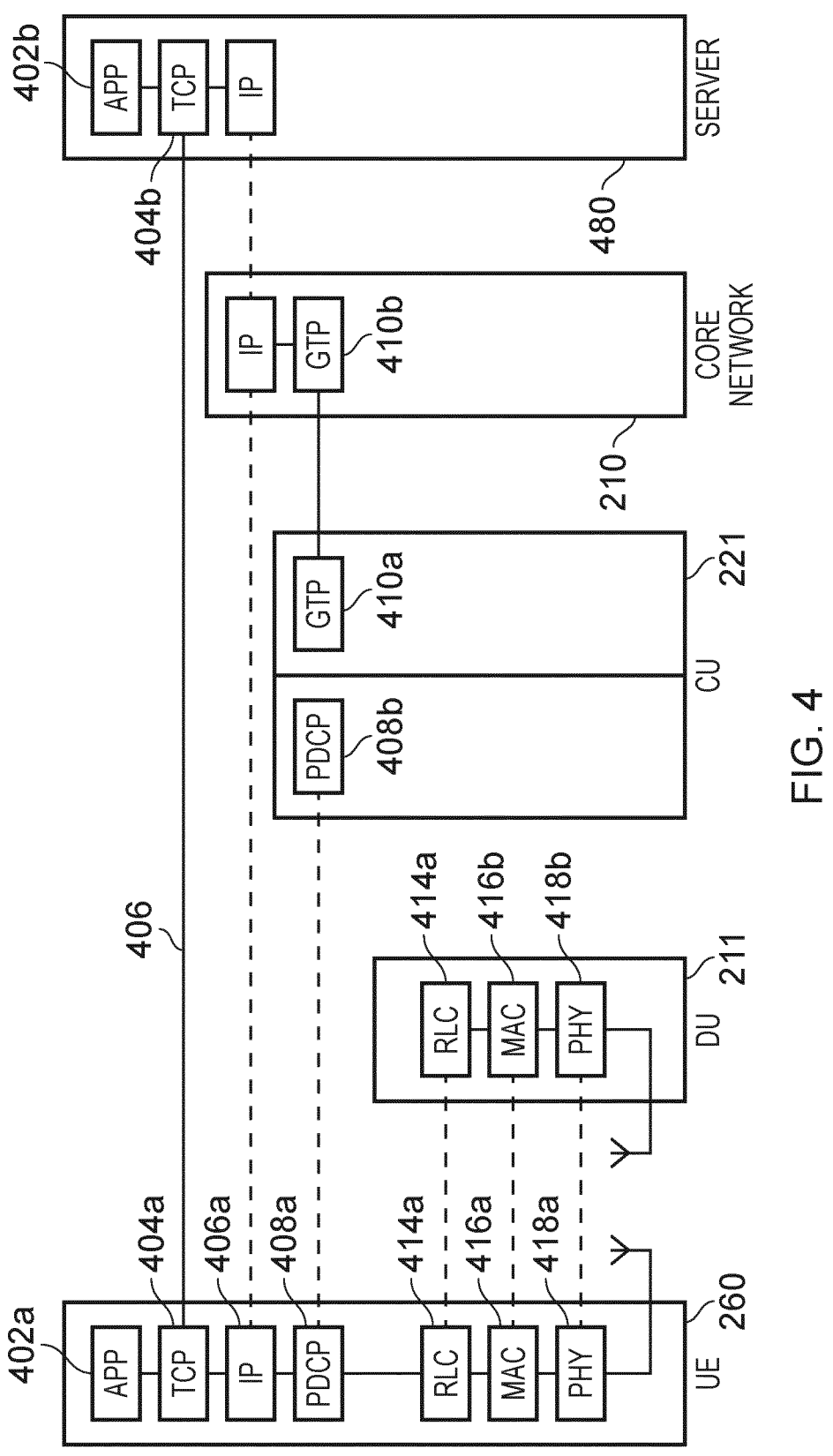
FIG. 4 illustrates schematically an example of interaction between TCP and a selection of lower layer protocols which may be adapted in accordance with embodiments of the present technique.

FIG. 4 illustrates schematically an example of interaction between TCP and a selection of lower layer protocols in the context of the network of FIG. 2.

An entity of an application 402a running on the communications device 260 generates data for transmission to a peer application entity 402b running at an endpoint such as on a server 480. The communications device 260 and server 480 each support TCP and, as the data is required to be transmitted reliably and in order, TCP protocol entities 404a, 404b running on the communications device 260 and server 480 are used.

In the example of FIG. 4, it is assumed that a TCP connection 406 is already established between the TCP protocol entities 404a, 404b.

Accordingly, data generated by the application entity 402a is processed by the TCP entity 404a. That is, it is assigned sequence numbers corresponding to bytes of the application data, and a TCP header is associated with the application data. As described above, the TCP data may comprise acknowledgement information regarding previous data received at the communications device's TCP protocol entity 400a using the TCP connection 406.

The combined TCP header and data is then passed to an IP protocol entity 406a in which an IP address associated with the communications device 260 is added as a source address, and an IP address associated with the server 480 is added as a destination address. (In some implementations, the IP protocol entity 406a may be integrated with the TCP protocol entity 404a).

The steps so far generally are broadly in accordance with protocols which can be applied irrespective of the nature of the network(s) via which the data is to be transmitted, provided that those networks provide for the transmission of IP packets—that is, data having an IP header. Accordingly, these protocol entities may be referred to as non access stratum (NAS) protocol or application layer protocols, which are arranged (in the conventional manner of describing a protocol stack) above, and can be distinguished from, "access stratum" (AS) protocols which are specific to a wireless access interface provided for the transmission of data by the communications device 260.

LTE and 5G/NR networks (including the core network parts) provide IP connectivity and thus can permit IP packets to be transmitted. The following steps (and embodiments described herein) are described with reference to a 5G/NR network, however it will be appreciated that the principles may apply to other wireless communications systems.

Below the NAS protocol(s), access stratum (AS) protocols relate specifically to the nature of the wireless access interface; accordingly, in the communications device 260, the IP packet is processed by one or more AS protocol entities.

In the example of FIG. 4, the AS protocol entities include a packet data convergence protocol (PDCP) entity 408*a*. A peer PDCP entity 408*b* is located within the CU 221; accordingly, the CU 221 is an example of an AS infrastructure equipment. The PDCP protocol may provide, for example, header compression functionality to reduce the quantity of information to be transmitted via the wireless access interface and security functions to protect the confidentiality of the data. Accordingly, the IP and TCP headers generated by the IP protocol entity 406*a* and the TCP protocol entity 404*a* may be compressed. A PDCP entity (such as the PDCP entity 408*a*) may form a PDCP header which is associated with (and transmitted together with) the data received from the IP protocol entity 406*a*. A peer PDCP entity (such as the PDCP entity 408*a*) which receives data having a PDCP header may remove the PDCP header, perform header decompression, and pass the resulting IP packet to the IP protocol entity 406*a*.

Other AS protocols include radio link control (RLC), medium access control (MAC) and physical layer (PHY) protocols. In the communications device 260, these are performed by RLC entity 414*a*, MAC entity 416*a*, and PHY entity 418*a*. Corresponding peer entities are within the DU 211: RLC entity 414*b*, MAC entity 416*b*, and PHY entity 418*b*; accordingly the DU 211 is an example of another AS infrastructure equipment.

Received PDCP protocol data units (PDUs) are formed at the DU's RLC entity 414*b* based on data transmitted over the wireless access interface, and forwarded via a backhaul link 420 to the CU 221.

At a PDCP entity 408*b* within the CU 221, the IP packet is formed by removing the PDCP header and applying any applicable header decompression and security functions. The IP packet is transmitted to the core network 210 using an appropriate backhaul protocol, such as general packet radio service (GPRS) tunnelling protocol (GTP). Accordingly, the CU 221 and core network 210 may have peer GTP entities 410*a*, 410*b* responsible for transmitting IP packets to and from the core network 210 via a GTP connection 412.

The core network 210 routes the IP packet based on its destination IP address to the server 480. In some examples the server 480 may be within the core network 210, may be directly connected to the core network 210, or may be reached from the core network 210 via one or more intermediate networks, such as the Internet. Examples and embodiments disclosed herein are not limited to a particular network topology in respect of the relative location of the server 480 and core network 210.

At the server 480, the TCP entity 404*b* processes the TCP packet and updates state information regarding the acknowledgement status of data associated with the TCP connection 406. The TCP header is removed and the resulting data is passed to the application 402*b*.

Data generated by the application 402*b* at the server 480 for transmission to the communications device 260 may be processed in, substantially, the reverse manner.

In the following, data generated at the application 402*b* in the server 480 is referred to as 'downlink data', while data generated at the application 402*a* in the communications device 260 is referred to as 'uplink data'.

Where there is significantly more uplink data than downlink data using a particular TCP connection, a significant portion of downlink transmissions on the wireless access interface may comprise TCP control packets.

There is accordingly a need to provide methods and apparatus for reliably and efficiently transmitting data via a wireless communications network, in particular for the transmission of uplink data transmitted by a communications device.

There is thus provided a method of receiving downlink data associated with an end-to-end connection between a communications device and an endpoint by an non-access stratum infrastructure equipment in a wireless communications network, the wireless communications network comprising a core network, the access stratum infrastructure equipment and another access stratum infrastructure equipment, the access stratum infrastructure equipment connected to the core network and to the other access stratum infrastructure equipment, the other access stratum infrastructure equipment, providing a wireless access interface, wherein the wireless access interface is for the transmission of data to and the reception of data from the communications device and the downlink data is for transmission to the communications device, the method comprising: receiving the downlink data from the core network, determining that the downlink data comprises a positive acknowledgement indication generated in accordance with an end-to-end protocol providing reliable, in-order delivery of data, the positive acknowledgement indication indicating that uplink data associated with the end-to-end connection transmitted by the communications device has been successfully received at the endpoint, and in response to determining that the downlink data comprises the positive acknowledgement indication, discarding the downlink data Embodiments of the present technique can reduce the amount of bandwidth or communications resources on the wireless access interface required for the transmission of control information associated with the end-to-end protocol, in particular when the quantity of user data (i.e. that which may be received by the respective protocol entities from an application or other higher layer protocols) in the uplink is significantly greater than that sent in the downlink. Accordingly, communications resources on a wireless access interface can be more efficiently used.

In [6] a related problem is considered, and proposals made to address the quantity of TCP acknowledgement data which must be transmitted by the communications device in order to ensure a high data rate for downlink data. Addressing the same problem, in [5], a proposal is made to modify the behaviour of the PDCP protocol so that TCP ACKs are mapped to PDCP control PDUs and processed differently from other TCP data.

However, these address the transmission of downlink data and the corresponding implications for the uplink transmission of TCP acknowledgements.

In embodiments of the present technique, the CU is enhanced to identify TCP control information received from the core network associated with an end-to-end TCP connection and to selectively discard TCP control information. In particular, TCP acknowledgement (ACK) information is discarded and not forwarded to the DU for transmission to the communications device.

Correspondingly, at the communications device, TCP control information is generated at a protocol entity lower than the TCP protocol entity and passed to the TCP entity, so as to appear to have been transmitted originally by the endpoint (such as the server 480).

Accordingly, the TCP protocol entity at the communications device receives sufficient acknowledgement information to ensure that a high rate of data transmission towards the server can be maintained, while the quantity of TCP control information transmitted in the downlink from the DU to the communications device is reduced compared with conventional techniques.

Figure 5:
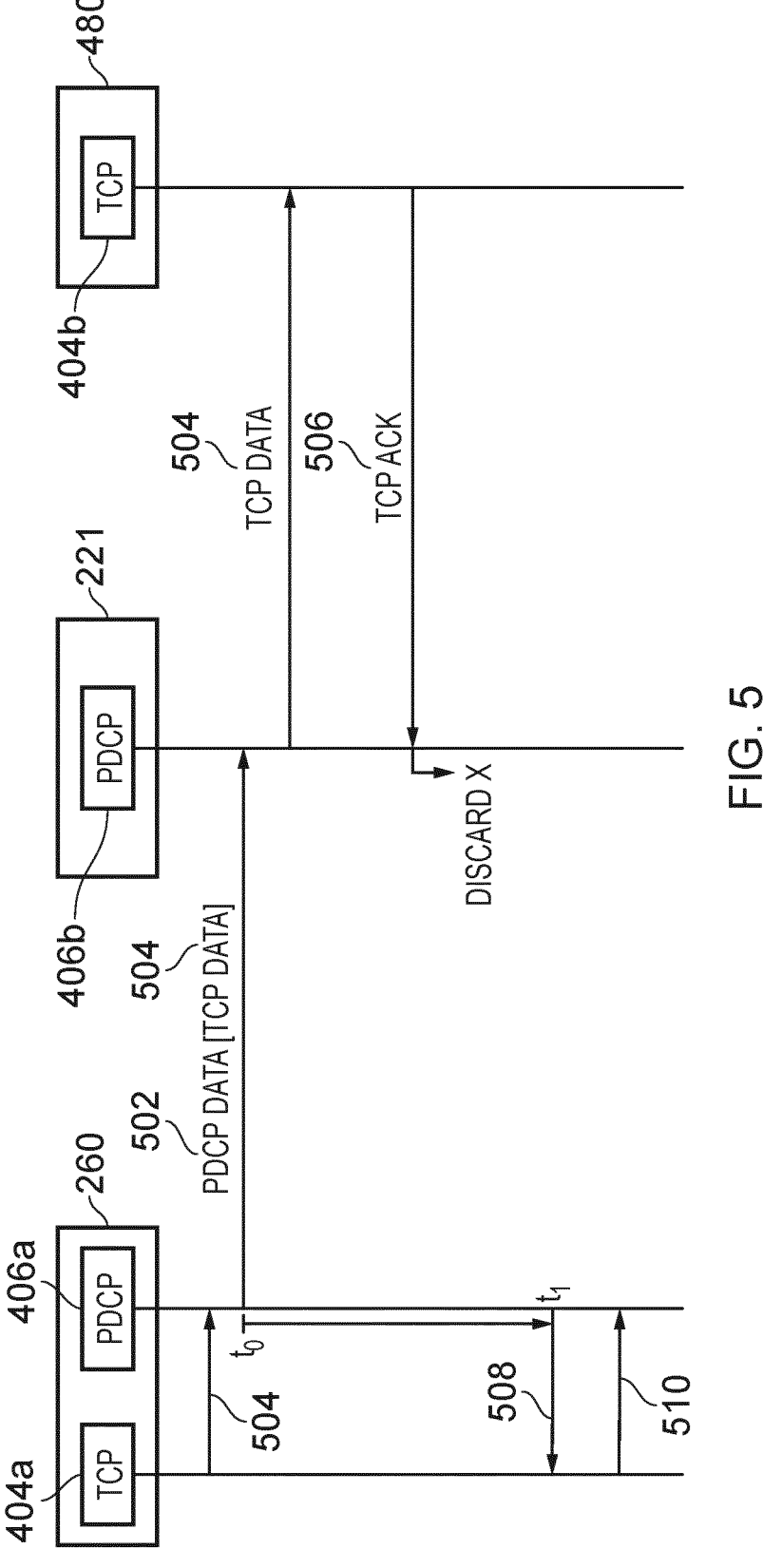
FIG. 5 illustrates a message sequence chart in accordance with embodiments of the present technique.

FIG. 5 illustrates a message sequence chart in accordance with embodiments of the present technique. FIG. 5 shows the communications device 260, CU 221 and server 480 as described above in respect of FIG. 4. Transmissions are shown at the PDCP layer between the communications device 260 and the CU 221. It will be readily apparent that PDCP transmissions comprise a transmission of data via a DU such as the DU 211 of FIG. 4, and in particular, using the appropriate access stratum protocols, via the wireless access interface provided by the DU. However, the details of these lower layer protocols are not important to the principles of the present disclosure and are omitted for conciseness. Similarly, the details of the transmission of TCP segments from the CU 221 to the server 480 are omitted for conciseness. In FIG. 5, the IP protocol entities are assumed to be integrated with respective TCP entities and IP layer functions are assumed to be incorporated within the TCP protocol entities. (Accordingly, references to TCP segment, TCP header, etc., refer to the TCP segment encapsulated in an IP packet and the combination of TCP header and IP header, respectively).

The sequence in FIG. 5 assumes that a TCP connection is already established between the TCP protocol entities 404a, 404b in the communications device 260 and the server 480 respectively. In the example of FIG. 5, because data is being transmitted from the communications device 260 to the server 480, the associated TCP protocol entities 404a, 404b are referred to as a sending TCP protocol entity and receiving TCP protocol entity, respectively. However, the present disclosure does not preclude that in addition, data is transmitted from the server 480 to the communications device 260 using the established TCP connection.

The sequence illustrated in FIG. 5 starts with a transmission of a TCP segment 504 comprising bytes numbered 5000-5500 from the sending TCP protocol entity 404a to the PDCP entity 406a of the communications device 260. The PDCP entity 406a forms one or more PDCP PDUs 502 containing the TCP segment 504 and forwards these to AS protocol entities for transmission via the wireless access interface to the DU 211 and hence to the CU 221. At this time t0, the PDCP entity 406a starts a timer of duration T_RTT_MAX_ESTIMATE and stores the sequence number of the highest-numbered byte in the TCP segment 504.

The PDCP entity 406b of the CU 221 processes the PDCP PDU(s) 502 to extract the TCP segment 504. The TCP segment 504 is forwarded via the core network 210 to the server 480.

In response to receiving the TCP segment 504, the TCP protocol entity 404b of the server 480, having no data to transmit to its peer entity 404a, generates a TCP control segment 506, comprising a TCP ACK indicating that the next byte expected to be received has the sequence number 5501. This is transmitted via the core network 210 to the CU 221.

At the CU 221, the PDCP protocol entity 406b receives the TCP control segment 506. The PDCP protocol entity 406b determines that the TCP control segment 506 is in fact a TCP control segment (for example, by inspecting the IP and TCP headers). The PDCP protocol entity 406b determines that discard criteria applicable to the TCP control segment 506 are met. In response, the PDCP protocol entity 406b discards the TCP control segment 506, and the TCP control segment 506 is not forwarded to the DU 211 for transmission to the communications device 260.

At time t1, the timer at the PDCP protocol entity 406a of the communications device 260 expires. In response, the PDCP protocol entity 406a generates a TCP ACK 508 which is passed to the TCP protocol entity 404a of the communications device 260. The TCP ACK 508 is formatted so as to indicate to the TCP protocol entity 404a that the previous TCP segment 504 was correctly received by the peer TCP protocol entity 404b of the server 480. For example, the IP header of the TCP ACK 508 indicates a source address associated with the server 480, and indicates that the next expected sequence number is one greater than the highest sequence number of the TCP segment 504.

In some embodiments, the TCP ACK 508 is substantially identical to the TCP ACK 506 discarded by the CU 221.

Based on the reception of the TCP ACK 508, the TCP protocol entity 404a updates its transmit window accordingly. In accordance with conventional TCP procedures, the TCP protocol entity 404a may transmit further data (such as second TCP segment 510).

It will be appreciated that, in accordance with the TCP protocol, the sending TCP protocol entity 404a may have multiple TCP segments 'in flight'—that is, segments which have been passed to lower layers for transmission but for which no positive acknowledgement has been received. Accordingly, in some embodiments, the PDCP protocol entity 406a may have multiple instances of the timer which are concurrently running, each associated with a TCP segment and sequence number. When an instance of the timer expires, a corresponding TCP ACK is generated and passed to the sending TCP protocol entity 404a Loss of Data TCP operates using a transmit window which limits the amount of TCP data which can be 'in flight' at any given time. As described above, TCP ACKs are generated by the PDCP protocol entity 406a at the communications device 260 and are passed to the sending TCP protocol entity 404a. This ensures that the sending TCP protocol entity 404a is able to advance its transmit window and does not stall its transmissions due to an absence of TCP ACKs, even though the CU 221 is discarding TCP ACKs generated by the server 480.

Accordingly, the rate at which data may be transmitted in accordance with the TCP protocol by the communications device 260 is not substantially reduced compared with a conventional technique in which all TCP control information is forwarded by the CU 221.

However, it is a further object of the present disclosure to ensure that any TCP data which is in fact not correctly received by the server 480 is retransmitted, in order to ensure reliable delivery of the TCP data.

Accordingly, discard criteria are applied at the CU 221 in order to selectively forward certain TCP control data in order to avoid a 'false positive' ACK at the communications device 260—that is, a scenario in which the sending TCP protocol entity 404a incorrectly determines that previously-transmitted TCP data has been received at the receiving TCP protocol entity 404b.

For example, according to a discard criterion, a duplicate TCP ACK—that is, one which indicates a next-expected sequence number which is the same as that indicated by a previous TCP ACK—is not to be discarded, but to be forwarded to the DU. Accordingly, the sending TCP protocol entity may receive duplicate ACKs: one generated by the PDCP entity 406a at the expiry of the appropriate timer, and a second forwarded from the CU 221 via the DU 211. In accordance with conventional processing of duplicate acknowledgements, the sending TCP protocol entity 404a may initiate a retransmission of data.

In addition, in some embodiment according to a discard criterion, a TCP selective ACK is never discarded. As described above, a TCP selective ACK indicates that the receiving TCP protocol entity 404b has determined that at least some TCP data has been transmitted by the sending TCP protocol entity 404a but not yet been received. For example this may be because data has been received out-of-order.

Figure 8:
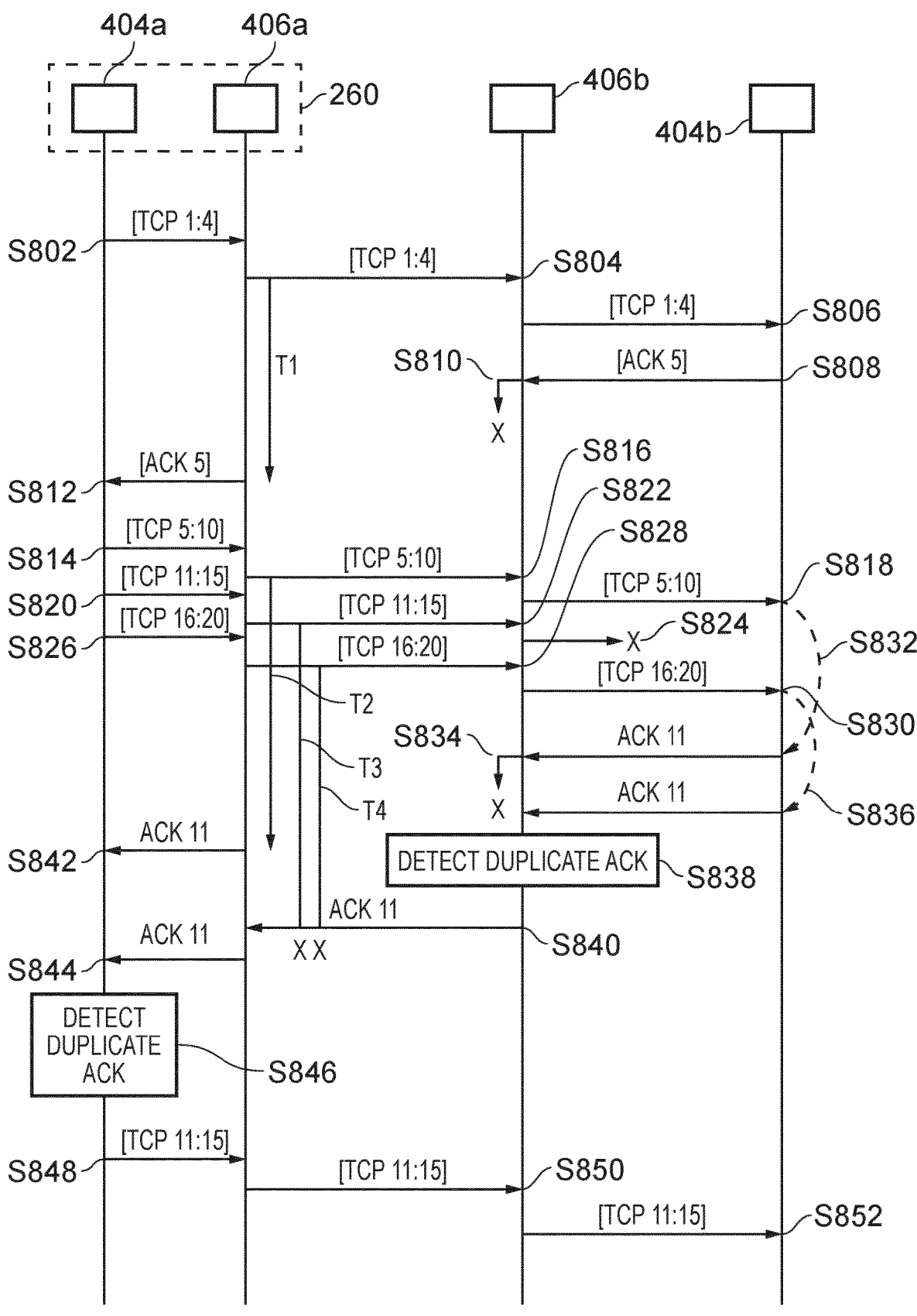
FIG. 8 illustrates a message flow in accordance with embodiments of the present technique.

FIG. 8 illustrates a sequence of transmissions of TCP data and acknowledgements in accordance with embodiments of the present disclosure, which illustrates how a duplicate TCP ACK may be detected and processed. For clarity and conciseness, only TCP data and control information is shown, although it will be appreciated that other signalling and headers associated with lower layer protocols will be transmitted, which may for example be broadly in accordance with conventional techniques.

The process starts at step S802 with the transmission of a TCP data segment containing data bytes numbered 1 to 4, denoted by [TCP 1:4] in FIG. 8. This is forwarded at step S804 by the UE PDCP protocol entity 406a via the wireless access interface and the DU 211 to the CU PDCP protocol entity 406b. At the same time, a timer T1 is started by the UE PDCP protocol entity 406a.

The CU PDCP protocol entity 406b forwards the TCP data bytes 1-4 via the core network (not shown) to the receiving TCP entity 404b at step S806.

In response, the receiving TCP entity 404b generates a TCP acknowledgement, indicating that the next expected TCP data has sequence number 5. This is denoted by [ACK 5] in FIG. 8. The TCP ACK is transmitted at step S808 to the CU 211 where it is processed by the CU PDCP entity 406b at step S810. In accordance with embodiments of the present technique, the CU PDCP entity 406b determines at step S810 that the data comprises only TCP acknowledgment information, and that it satisfies any other applicable discard criteria. Accordingly, the TCP ACK is discarded, as indicated by the 'x' in FIG. 8.

Subsequently, the timer T1 expires and in response, at step S812, the UE PDCP entity 406a generates a TCP acknowledgement indicating that the next expected TCP data has sequence number 5, and passes this to the sending TCP protocol entity 404a. Thus, the sending TCP protocol entity 404a determines that TCP data bytes 1-4 have been received correctly, while no communications resources of the wireless access interface have been used in respect of the acknowledgement.

Subsequently at steps S814, S820, and S826, TCP segments comprising data bytes 5-10, 11-15, and 16-20 respectively are generated by the TCP protocol entity 404a at the UE 260 and passed to the PDCP protocol entity 406a. At steps S816, S822 and S828, the TCP segments are transmitted via the wireless access interface from the UE 260 to the CU 221 and are accordingly received at the CU PDCP protocol entity 406b. At the UE 260, timers T2, T3 and T4 are started when the respective TCP segments are passed by the PDCP protocol entity 406b to lower layer protocols (e.g. the RLC protocol entity 414a) for transmission.

At steps S818, S824 and S830, the TCP segments are transmitted via the core network to the receiving TCP protocol entity 404b. However, as indicated by the 'x' in step S824, the TCP segment comprising data bytes 11-15 does not arrive at the receiving TCP protocol entity 404b. Although the loss is shown as occurring between the CU 221 and the receiving TCP protocol entity 404b, it is not important where or how the packet is lost, after it has been transmitted by the UE 260.

In response to receiving the TCP segment comprising data bytes 5-10, the receiving TCP protocol entity 404b generates and transmits at step S832 TCP ACK 11—i.e. an acknowledgement indicating that the next expected byte is numbered 11.

Similarly, in response to receiving the TCP segment comprising data bytes 16-20, the receiving TCP protocol entity 404b generates and transmits at step S836 TCP ACK 11. This is because although bytes 16-20 have been received, these have not been received in order and the next in-sequence byte expected is still that numbered 11.

Similar to the processing at step S810, at step S834, the CU PDCP protocol entity 406b processes the first ACK 11 and discards it. However, at step S838, the CU PDCP protocol entity 406b processes the second ACK 11 and determines that it is a duplicate of a previously received TCP ACK. Accordingly, the discard criteria are not satisfied and the second TCP ACK 11 is forwarded at step S840 to the DU 211 and onwards via the wireless access interface to the UE 260.

Meanwhile, at the UE PDCP protocol entity 406a, the timer T2 has expired and so at step S842, a TCP ACK 11 is generated at forwarded to the sending TCP protocol entity 404a.

Subsequently (although it will be appreciated that in some examples, the order may be reversed), the TCP ACK 11 forwarded by the CU 221 at step S840 is received by the UE PDCP protocol entity 406a and forwarded to the sending TCP protocol entity 404a at step S844.

Thus, the sending TCP protocol entity 404a receives two TCP ACKs, both indicating that the next expected data (to be received by the receiving TCP protocol entity 404b) has sequence number 11.

In accordance with conventional TCP procedures, the sending TCP protocol entity 404a determines at step S846 that duplicate acknowledgements have been received and that previously transmitted data has been either lost or received out of order. The sending TCP protocol entity 404a accordingly retransmits the data segment comprising bytes 11-15 at step S848, which is forwarded to the CU 221 in step S850 and further to the receiving TCP protocol entity 404b at step S852.

In some embodiments, in response to receiving the first TCP ACK 11 forwarded from the CU 221 at step S840, the UE PDCP protocol entity 406a determines that the expiry of timers T3 and T4 (i.e. those which correspond to the transmission of higher-numbered TCP data) is not to result in the generation of a TCP ACK to be forwarded to the sending TCP protocol entity 404a. In some embodiments, the timers T3 and T4 are cancelled in response to the receipt of the TCP ACK 11 at step S840. Thus, the sending TCP protocol entity 404a does not incorrectly determine that TCP data has been received correctly and in-order by the receiving TCP protocol entity 404b.

It will be appreciated that steps shown in FIG. 8 may occur in a different sequence (for example, the transmission of the first ACK 11 at step S832 may occur before the receipt of the TCP data 16-20). It will also be appreciated that some subsequent and preceding steps (such as the establishment of the TCP connection, and subsequent acknowledgement and data transmissions) have been omitted for conciseness.

In accordance with embodiments of the present technique, timers at the UE PDCP protocol entity 406a are sufficiently long to ensure that duplicate acknowledgements forwarded by the CU 221 are received prior to the expiry of timers associated with data having a higher sequence number, in order to ensure that the sending TCP entity 404a does not discard from its transmit buffer data which has been lost.

In accordance with embodiments of the present technique, timers are set such that any selective ACK is received before any timer associated with data that can be indicated as missing by the selective ACK expires, in order to prevent the generation by the UE PDCP protocol entity 406a of a TCP ACK indication which will prevent any retransmission of lost data.

In some embodiments, the CU 221 maintains TCP connection identification information and TCP connection state information associated with the TCP connection. For example, the TCP connection identification information may comprise IP addresses and port numbers used for IP packets carrying TCP data associated with the TCP connection.

In some embodiments, there is a predetermined maximum number of consecutively received TCP control packets associated with a TCP connection which can be discarded. Once this maximum is reached, then the next received TCP control packet is forwarded to the DU.

The TCP connection state information may comprise a number of consecutively discarded TCP control data packets associated with the connection, which may be reset to zero when a TCP control data packet is forwarded to the DU.

In some embodiments, if TCP control data is determined not to satisfy the discard criteria because it indicates (or may indicate) that TCP data has not been received (i.e. comprises negative acknowledgement information), and thus is forwarded to the DU, then subsequent TCP control data is also forwarded to the DU. For example, a predetermined number of packets containing TCP control data which are received by the CU after the forwarded TCP control data comprising the negative acknowledgement information is forwarded to the DU, irrespective of their contents.

Accordingly, the TCP connection state information may comprise a number of consecutively forwarded TCP control data packets since a most recent TCP control data did not satisfy the criteria for forwarding.

Estimation of RTT

In some embodiments of the present disclosure, the duration of the timer used by the PDCP protocol entity 406a is set to an estimate of a communications device-server round-trip time, that is, the time from the transmission of data by the communications device 260 until the reception of a TCP ACK transmitted by the server 480 in response to receiving the data.

In some embodiments, the communications device-server round-trip time is estimated by the communications device based on TCP control data generated by the server 480 which is forwarded by the CU 221 and not discarded.

In some embodiments, to permit the communications device to measure the communications device-server round-trip time, TCP control data packets associated with the TCP connection are forwarded by the CU 221 to the DU 211. For example, in some embodiments, at the start of a TCP connection, TCP control data packets associated with the TCP connection are forwarded by the CU 221 to the DU 211. TCP control data packets may be forwarded for a predetermined duration, or until a predetermined number of TCP control data packets have been forwarded.

In some embodiments, the communications device 260 determines the communications device-server round-trip time based on one or more indications transmitted by the CU 221 to the communications device 260. The indications may comprise measurements (or statistics thereof) of a CU-server round-trip delay between the CU 221 and the server 480. The CU 221 may estimate or measure a CU-server round-trip delay between the CU 221 and the server 480, based on transmitted TCP data and received TCP ACKs associated with the TCP connection.

In some embodiments, the CU 221 and/or the communications device may estimate or measure a communications device-CU round trip time.

The CU 221 may transmit an indication to the communications device 260 an average, maximum and/or minimum communications device-CU round-trip delay. Alternatively, the CU 221 may estimate, based on measurements of the CU-server round-trip delay and of the communications device-CU round-trip delay, the communications device-server round trip delay.

The communications device 260 may thus determine communications device-server round-trip time based on measurements or indications of the communications device-CU round-trip delay combined with an indication of the CU-server round-trip delay. Alternatively, the communications device may receive an indication of an estimated communications device-server round-trip time transmitted by the CU.

The communications device 260 may set the timer based on the determined communications device-server round-trip time. Any TCP control data which may indicate that data has not been received by the server 480 must be received by the communications device before the communications device generates a TCP ACK indicating that the data has been successfully received is generated in response to the expiry of the timer. Accordingly, the timer must not be set to a duration less than the minimum communications device-server round-trip time, and should preferably be set to a maximum communications device-server round-trip time (taking into account, for example, variation in scheduling delays, congestion, which may be applicable to either the TCP segment or to the TCP control data).

Using one of the above techniques, the communications device 260 may determine a range of the communications device-server round-trip time. In some embodiments, the communications device 260 sets the timer to expire after a time period equal to the highest time period in the range.

Indications of round trip times transmitted by the CU 221 to the communications device 260 may be within a PDCP control PDU, generated by the PDCP protocol entity 408b of the CU 221 and received and processed by the PDCP protocol entity 408a of the communications device 260. In some embodiments, the indications of the round trip times transmitted by the CU 221 to the communications device 260 may be within a PDCP data PDU.

In some embodiments, indications of round trip times transmitted by the CU 221 to the communications device 260 may be within a radio resource control (RRC) configuration message.

Figure 6:
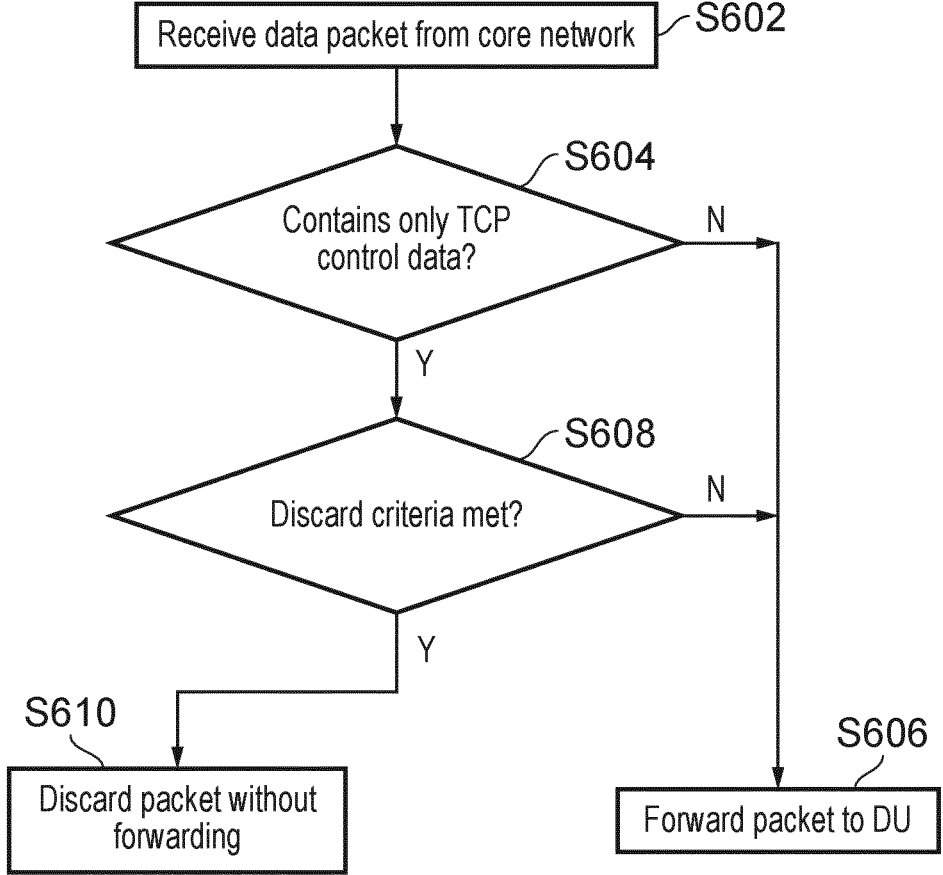
FIG. 6 illustrates a flow chart for a process carried out by a network equipment such as a centralised unit (CU) in accordance with embodiments of the present technique.

FIG. 6 illustrates a flow chart for a process carried out by the CU 221 (in particular, for example, by the PDCP protocol entity 404*b* of the CU 221) in accordance with embodiments of the present technique.

The process starts at step S602 when the CU 221 receives from the core network data for transmission to the communications device 260. The CU 221 may determine that the data is for transmission to the communications device 260 based on a GTP header associated with the data.

In step S604, the CU 221 determines whether the data comprises solely TCP acknowledgement information. If not (i.e., the data comprises data generated at an application or protocol layer above the TCP layer or the data is not associated with a TCP connection and does not have a TCP header), then control assess to step S606.

In step S606, the data is processed by the PDCP protocol entity 404*b* in accordance with conventional techniques, and transmitted via a backhaul connection to the DU 211, for transmission to the communications device 260.

If at step S604, the CU 221 determines that the data comprises only TCP acknowledgement information, then control passes to step S608. In step S608, the CU 221 determines whether the TCP acknowledgement information satisfies one or more discard criteria, as will be described in more detail below with respect to FIG. 7.

If no discard criteria are satisfied, then control passes to step S606.

If one or more discard criteria are satisfied, then control passes to step S610 and the data is discarded.

Figure 7:
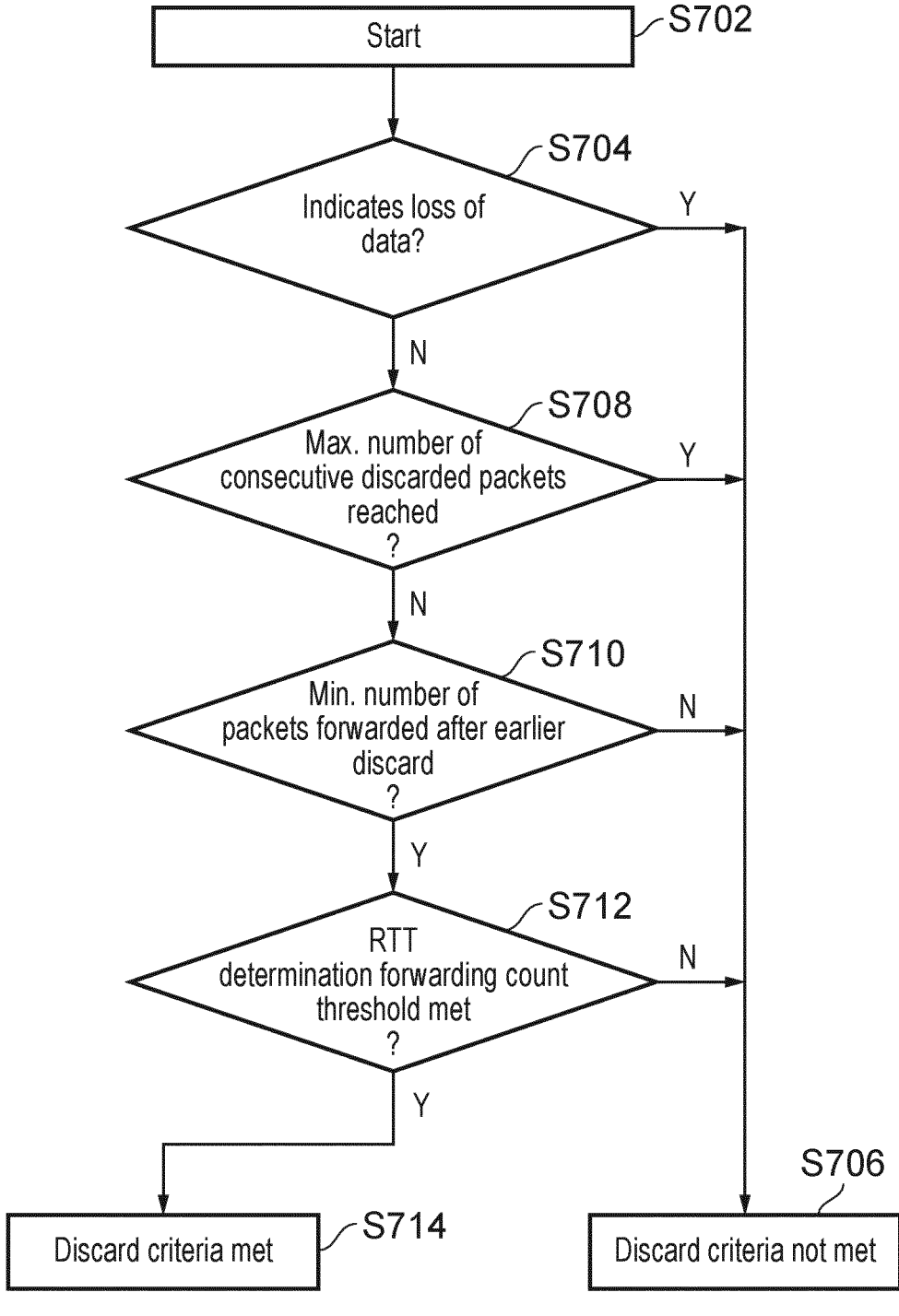
FIG. 7 illustrates a flow chart for a further process carried out by a network equipment such as a CU in accordance with embodiments of the present technique.

FIG. 7 illustrates a flow chart for a process carried out by the CU 221 (in particular, for example, by the PDCP protocol entity 404*b* of the CU 221) in accordance with embodiments of the present technique. The process illustrated in FIG. 7 may correspond to the evaluation at step S608 of the process illustrated in FIG. 6 and described above.

The process starts at step S702. The process is applied in respect of data received from the core network, for transmission to the communications device 260, the data comprising TCP control information. Control passes to step S704.

At step S704, it is determined if the data comprises negative acknowledgement information. That is if, according to the TCP protocol, receipt of the data could lead at the sending TCP protocol entity to an inference (either directly, or in combination with other TCP control data) that data has been lost and/or received out of order by the receiving TCP protocol entity. A TCP Selective ACK, for example, may lead to the inference that a portion of data has not been received correctly by the receiving TCP protocol entity; therefore, if the TCP data comprises a TCP Selective ACK, the data comprises negative acknowledgement information.

The other TCP control data may include TCP control data which will be, or has been, generated by the PDCP protocol entity at the UE in accordance with embodiments of the present disclosure. Thus, for example, while a positive acknowledgement indicating that byte 'N' is the next in sequence data byte expected may not comprise negative acknowledgement information, a second positive acknowledgement also indicating byte 'N' is the next in sequence data byte expected may comprise negative acknowledgement information. This is because in accordance with conventional TCP algorithms, a duplicate TCP ACK may indicate that certain data has not been correctly received. Accordingly, a second (or subsequent) TCP ACK having a same 'next expected' byte indication as a previous TCP ACK may comprise negative acknowledgement information.

If the data comprises negative acknowledgement information, then control passes to step S706, and a minimum forwarding count counter (described below) is reset to zero.

If at step S704 it is determined that the data does not comprise negative acknowledgement information, then control passes to step S708.

At step S708, it is determined if a counter indicating a number of consecutively received TCP control data packets that have been discarded and not forwarded to the DU exceeds a predetermined maximum discard count threshold. If it is determined that the counter exceeds the maximum discard count threshold, then control passes to step S706 and the counter is reset. Otherwise, control passes to step S710 and the counter is incremented.

At step S710, it is determined i) if previously received data was forwarded to the DU because it comprised negative acknowledgement information, and ii) if the minimum forwarding count counter indicating a number of consecutively forwarded TCP control data packets since the most recently forwarded data satisfying requirement i) does not exceed a predetermined minimum forwarding count threshold. If these requirements are both satisfied, then control passes to step S706 and the minimum forwarding count counter is incremented by one, otherwise control passes to step S712.

At step S712, it is determined whether a number of data packets (or in some embodiments, TCP control data packets) originating at the sending TCP protocol entity and associated with the present TCP connection have been forwarded to the DU for transmission to the communications device exceeds a predetermined RTT determination forwarding count threshold. If the number of packets does not exceed the predetermined RTT determination forwarding count threshold, then control passes to step S706, otherwise control passes to step S714.

At step S706, it is determined that the discard criteria are not satisfied, and therefore that, according to the discard criteria, the TCP control information should be forwarded to the DU.

At step S714, it is determined that the discard criteria are satisfied, and therefore that, according to the discard criteria, the TCP control information should not be forwarded to the DU, but should be discarded.

As described above, the process illustrated in FIG. 7 may be used to evaluate the discard criteria at step S608 of the process of FIG. 6.

Maximum Discard Count Threshold and RTT Determination Forwarding Count Threshold In the process illustrated in FIG. 7, it is determined if a counter indicating a number of consecutively received TCP control data packets that have been discarded and not forwarded to the DU exceeds a predetermined maximum discard count threshold.

This step ensures that the communications device 260 receives a proportion of TCP control data packets originating at the receiving TCP protocol entity.

In some embodiments, the predetermined maximum discard count threshold is fixed according to standards specifications. For example, the predetermined maximum discard count threshold may be set to 24, so that (at least) every $25^{th}$ TCP control packet received at the CU from the core network is forwarded to the communications device 260.

In some embodiments, the predetermined maximum discard count threshold is configured by the wireless communications network. In some embodiments, the predetermined maximum discard count threshold is adapted based on previously collected data associated with a service (which may be identified by a port number and/or IP address associated with the server 480 or from quality of service (QoS) flow information present in a service data adaptation protocol (SDAP) layer header, or a combination of above). In some embodiments, an SDAP protocol entity within the CU 221 may provide an indication of the QoS flow information to the PDCP entity 406*b* of the CU 221.

In some embodiments, as described above in respect of FIG. 7, TCP control data is not discarded if the RTT determination forwarding count threshold has not been met i.e. a number of TCP control data packets forwarded by the CU to the DU has not yet passed a threshold.

This may ensure that the TCP slow start mechanism is not affected by the discarding of packets at the CU. It also permits the communications device 260 to evaluate the communications device-server round-trip delay.

Other Criteria

In some embodiments, the discard criteria are adaptively modified, for example based on one or more of a quantity of data transmitted using the TCP uplink, an assessment of radio conditions applicable to transmissions between the DU 211 and the communications device 260, sequence numbers indicated as not having being received by the receiving TCP protocol entity, and such like.

For example, in some embodiments, the predetermined maximum discard count threshold is increased in response to a determination that a rate of data transmitted using the TCP connection exceeds a predetermined threshold.

In some embodiments, if it determined that the radio conditions applicable to transmissions between the DU 211 and the communications device 260 deteriorate such that the likelihood of data loss between the DU and the communications device increases above a threshold, then all TCP control data may be forwarded to mitigate the effect of a negative acknowledgement and corresponding subsequent TCP slow start process. For example, the CU 221 may determine that wireless access interface criteria based on radio measurements associated with the wireless access interface between the DU 211 and the communications device 260 are satisfied, and in response, determine that the discard criteria cannot be satisfied (i.e. that all TCP control data is to be forwarded to the DU 211 for transmission to the communications device 260). The wireless access interface criteria may generally be satisfied if relatively poor performance of the radio link between the DU and the communications device is being (or is likely to be) experienced. The wireless access interface criteria may be based on one or more of radio measurements, such as Reference Signal Received Power (RSRP)/Reference Signal Received Quality (RSRQ)/signal to interference and noise ratio (SINR) measurements, statistics related to a number of RLC retransmissions or hybrid automatic repeat request (HARQ) retransmissions required for correct reception of data transmitted via the wireless access interface, and measured error rates, such as block error rate or bit error rate. For example, the wireless access criteria may be satisfied if the average block error rate, measured over the last three seconds in respect of data transmitted by the communications device 260 and received at the DU 211 exceeds 15%.

The determination that the wireless access criteria are satisfied may comprise receiving an indication of the measurements from the DU 211 and/or from the communications device 260. Alternatively or additionally, the DU 211 and/or the communications device 260 may determine that the wireless access interface criteria are met and transmit an indication that the wireless access interface criteria are met to the CU 221.

In some embodiments, the discard criteria may be based on a rate of detected negative acknowledgement indications. For example, where three or more negative acknowledgment indications are detected in respect of a TCP connection within one second, the CU 221 may determine that the discard criteria cannot be satisfied (irrespective of any other criteria being satisfied) so that all TCP control data is forwarded to the DU 211.

In any case, for TCP data generated by the sending TCP protocol entity for which no TCP ACK is received before the expiry of the corresponding timer at the communications device 260, TCP ACK may be generated by the PDCP protocol entity 406*a* at the communications device 260.

PDCP Sequence Numbers

Conventionally, PDCP protocol entities assign a sequence number to each PDCP PDU in order to permit in-order delivery of data within received PDCP PDUs to upper protocol layers.

In some embodiments of the present technique, PDCP sequence numbers are assigned to TCP control data packets which are discarded by the CU's PDCP protocol entity 406*b*; similarly, the communications device 260 assigns PDCP sequence numbers to TCP ACKs which are generated in response to timer expiry. Accordingly, the PDCP protocol entity in the communications device 260 is able to process any forwarded TCP control data packets based on the sequence number taking into account PDCP PDUs which were not actually transmitted.

In some embodiments, negative acknowledgement information forwarded by the CU to the UE is associated with a PDCP sequence number. To mitigate against the possibility that the negative acknowledgement information is not successfully received by the UE, then the CU PDCP protocol entity 406*b* may pre-emptively ('blindly') retransmit the negative acknowledgement information, using the same PDCP sequence number. At the UE, the UE PDCP protocol entity 406*a* may detect duplicate transmissions of negative acknowledgement information based on the PDCP sequence number and accordingly discard duplicate negative acknowledgement information.

In some embodiments, PDCP sequence numbers are not assigned to discarded TCP control data packets. Although this may introduce some additional latency (because intermediate TCP ACKs will be generated only once the corresponding timer has expired), this simplifies the processing at both PDCP entities.

In the examples illustrated above, the TCP protocol entity 404*a* is shown as being implemented within the communications device 260. However, the present disclosure is not so limited, and the TCP protocol entity 404*a* may be within a discrete device connected to the communications device 260 by a wired connection (e.g. USB), or by a short-range wireless communications link using e.g. Bluetooth, or Wi-Fi direct.

In the present description, functions are described as being done by particular protocol entities. However, this is merely for clarity and functions may be performed by any suitable processor or circuitry.

In some embodiments, the processes described above, and illustrated in FIG. 6 and FIG. 7 may be modified by the addition, omission or re-ordering of steps.

In some embodiments the TCP connection may be operated by the respective endpoints in accordance with various well-known modifications and variations to the TCP protocol, for example involving the use of delayed acknowledgements according to RFC 1122 [7].

In the description, examples have been described whereby the end-to-end protocol providing reliable, in-order delivery is the TCP protocol. However it will be appreciated that the scope of the present disclosure is not so limited. For example, the Quick User Datagram Protocol (UDP) Internet Connections (QUIC) protocol may be used in some embodiments, in particular where the QUIC packets are not encrypted. In such embodiments, the negative acknowledgement indication may comprise a QUIC NACK control packet.

Thus there has been described a method of receiving downlink data associated with an end-to-end connection between a communications device and an endpoint by an access stratum infrastructure equipment in a wireless communications network, the wireless communications network comprising a core network, the access stratum infrastructure equipment and another access stratum infrastructure equipment, the access stratum infrastructure equipment connected to the core network and to the other access stratum infrastructure equipment, the other access stratum infrastructure equipment providing a wireless access interface, wherein the wireless access interface is for the transmission of data to and the reception of data from the communications device and the downlink data is for transmission to the communications device, the method comprising: receiving the downlink data from the core network, determining that the downlink data comprises a positive acknowledgement indication generated in accordance with an end-to-end protocol providing reliable, in-order delivery of data, the positive acknowledgement indication indicating that uplink data associated with the end-to-end connection transmitted by the communications device has been successfully received at the endpoint, and in response to determining that the downlink data comprises the positive acknowledgement indication, discarding the downlink data.

There has also been described a method for transmitting uplink data associated with an end-to-end connection to an endpoint by a communications device in a wireless communications network, the wireless communications network comprising a first access stratum infrastructure equipment connected to a core network, and a second access stratum equipment providing a wireless access interface and connected to the first access stratum infrastructure equipment, the method comprising determining an estimated maximum round-trip time, the maximum round trip time comprising a total time from the transmission of data by the communications device using the end-to-end connection to the reception by the communications device of an acknowledgement indication transmitted by the endpoint in response to receiving the data, transmitting via the wireless access interface the uplink data in accordance with an end-to-end protocol providing reliable, in-order delivery of data, wherein the end-to-end connection was established in accordance with the end-to-end protocol, determining that the estimated maximum round-trip time has passed since transmitting the data, in response to determining that the estimated maximum round-trip time has passed since transmitting the data, updating stored state information associated with the end-to-end connection to indicate that the uplink data has been successfully received at the endpoint, and transmitting second uplink data associated with the end-to-end connection in accordance with the end-to-end protocol and the updated stored state information.

Corresponding communications devices, infrastructure equipment and methods therefore, and circuitry for a communications device and circuitry for an infrastructure equipment have also been described.

It will be appreciated that while the present disclosure has in some respects focused on implementations in an LTE-based and/or 5G network for the sake of providing specific examples, the same principles can be applied to other wireless telecommunications systems. Thus, even though the terminology used herein is generally the same or similar to that of the LTE and 5G standards, the teachings are not limited to the present versions of LTE and 5G and could apply equally to any appropriate arrangement not based on LTE or 5G and/or compliant with any other future version of an LTE, 5G or other standard.

It may be noted various example approaches discussed herein may rely on information which is predetermined/predefined in the sense of being known by both the base station and the communications device. It will be appreciated such predetermined/predefined information may in general be established, for example, by definition in an operating standard for the wireless telecommunication system, or in previously exchanged signalling between the base station and communications devices, for example in system information signalling, or in association with radio resource control setup signalling, or in information stored in a SIM application. That is to say, the specific manner in which the relevant predefined information is established and shared between the various elements of the wireless telecommunications system is not of primary significance to the principles of operation described herein. It may further be noted various example approaches discussed herein rely on information which is exchanged/communicated between various elements of the wireless telecommunications system and it will be appreciated such communications may in general be made in accordance with conventional techniques, for example in terms of specific signalling protocols and the type of communication channel used, unless the context demands otherwise. That is to say, the specific manner in which the relevant information is exchanged between the various elements of the wireless telecommunications system is not of primary significance to the principles of operation described herein.

It will be appreciated that the principles described herein are not applicable only to certain types of communications device, but can be applied more generally in respect of any types of communications device, for example in respect of any type of communications device operating with a wireless link to the communication network and using a protocol providing end-to-end reliability.

It will further be appreciated that the principles described herein are not applicable only to LTE-based wireless telecommunications systems, but are applicable for any type of wireless telecommunications system that supports end-to-end data transmission.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered paragraphs:

Paragraph 1. A method of receiving downlink data associated with an end-to-end connection between a communications device and an endpoint by an access stratum infrastructure equipment in a wireless communications network, the wireless communications network comprising a core network, the access stratum infrastructure equipment and another access stratum infrastructure equipment, the access stratum infrastructure equipment connected to the core network and to the other access stratum infrastructure equipment, the other access stratum infrastructure equipment providing a wireless access interface, wherein the wireless access interface is for the transmission of data to and the reception of data from the communications device and the downlink data is for transmission to the communications device, the method comprising: receiving the downlink data from the core network, determining that the downlink data comprises a positive acknowledgement indication generated in accordance with an end-to-end protocol providing reliable, in-order delivery of data, the positive acknowledgement indication indicating that uplink data associated with the end-to-end connection transmitted by the communications device has been successfully received at the endpoint, and in response to determining that the downlink data comprises the positive acknowledgement indication, discarding the downlink data.

Paragraph 2. A method according to paragraph 1, wherein the downlink data does not comprise any data generated by an application or higher layer protocol which uses the end-to-end protocol to ensure reliable and in-order delivery of that data.

Paragraph 3. A method according to paragraph 1 or paragraph 2, the method comprising receiving from the other access stratum infrastructure equipment uplink data, the uplink data transmitted by the communications device, determining that the uplink data comprises a header generated in accordance with the end-to-end protocol and comprises a sequence number associated with the uplink data, and storing the sequence number associated with the uplink data.

Paragraph 4. A method according to any of paragraphs 1 to 3, the method comprising receiving second downlink data from the core network, determining that the second downlink data comprises a negative acknowledgement indication generated in accordance with the end-to-end protocol indicating that at least a portion of uplink data transmitted by the communications device associated with the end-to-end connection has not been successfully received at the endpoint, and in response to determining that the second downlink data comprises a negative acknowledgement indication, forwarding the second downlink data to the other access stratum infrastructure equipment for transmission to the communications device.

Paragraph 5. A method according to paragraph 4, wherein the negative acknowledgement indication comprises a selective acknowledgement indicating that data associated with a range of sequence numbers has not been received.

Paragraph 6. A method according to any of paragraphs 1 to 5, the method comprising receiving third downlink data from the core network, determining that the third downlink data comprises data which is associated with the end-to-end connection and is generated by an application or higher layer protocol which uses the end-to-end connection for the transmission of data, and based on the determining that the third downlink data comprises data which is associated with the end-to-end connection and is generated by an application or higher layer protocol which uses the end-to-end connection for the transmission of data, forwarding the third downlink data to the other access stratum infrastructure equipment for transmission to the communications device.

Paragraph 7. A method according to any of paragraphs 1 to 6, the method comprising determining a round trip time between the communications device and the endpoint, the round trip time comprising a total time from the transmission of data by the communications device using the end-to-end connection to the reception by the communications device of an acknowledgement indication transmitted by the endpoint in response to receiving the data, and transmitting an indication of the determined round trip time to the other access stratum infrastructure equipment for transmission to the communications device.

Paragraph 8. A method according to any of paragraphs 1 to 7, the method comprising receiving fourth downlink data from a core network, determining that the fourth downlink data comprises a positive acknowledgement indication generated in accordance with the end-to-end protocol associated with the end-to-end connection, and does not comprise data which is associated with the end-to-end connection and is generated by an application or higher layer protocol which uses the end-to-end connection for the transmission of data, determining that the fourth downlink data satisfies predetermined conditions for forwarding to the communications device, and in response to determining that the fourth downlink data satisfies the predetermined conditions, forwarding the fourth downlink data to the other access stratum infrastructure equipment for transmission to the communications device.

Paragraph 9. A method according to paragraph 8, wherein the fourth downlink data satisfies the predetermined conditions if a time period since a most recent downlink data associated with the end-to-end connection has been forwarded to the other access stratum infrastructure equipment for transmission to the communications device exceeds a predetermined time period.

Paragraph 10. A method according to paragraph 8 or paragraph 9, wherein the fourth downlink data satisfies predetermined conditions if number of downlink data packets associated with the end-to-end connection discarded by the access stratum infrastructure equipment since a most recent downlink data associated with the end-to-end connection has been forwarded to the other access stratum infrastructure equipment for transmission to the communications device exceeds a predetermined maximum discard count threshold.

Paragraph 11. A method for transmitting uplink data associated with an end-to-end connection to an endpoint by a communications device in a wireless communications network, the wireless communications network comprising a first access stratum infrastructure equipment connected to a core network, and a second access stratum equipment providing a wireless access interface and connected to the first access stratum infrastructure equipment, the method comprising determining an estimated maximum round-trip time, the maximum round trip time comprising a total time from the transmission of data by the communications device using the end-to-end connection to the reception by the communications device of an acknowledgement indication transmitted by the endpoint in response to receiving the data, transmitting via the wireless access interface the uplink data in accordance with an end-to-end protocol providing reliable, in-order delivery of data, wherein the end-to-end connection was established in accordance with the end-to-end protocol, determining that the estimated maximum round-trip time has passed since transmitting the data, in response to determining that the estimated maximum round-trip time has passed since transmitting the data, updating stored state information associated with the end-to-end connection to indicate that the uplink data has been successfully received at the endpoint, and transmitting second uplink data associated with the end-to-end connection in accordance with the end-to-end protocol and the updated stored state information.

Paragraph 12. A method according to paragraph 11, the method comprising determining that when the estimated maximum round-trip time has passed since transmitting the data, no negative acknowledgement indication indicating that at least a portion of the uplink data has been successfully received at the endpoint has been received, wherein the updating the stored state information associated with the end-to-end connection is in response to determining that no negative acknowledgement indication has been received.

Paragraph 13. A method according to paragraph 11 or paragraph 12, wherein updating the stored state information associated with the end-to-end connection to indicate that the uplink data has been successfully received at the endpoint comprises generating, at a packet data convergence protocol (PDCP) entity of the communications device, control information, the control information indicating that the uplink data has been successfully received at the endpoint, the control information formatted according to the end-to-end protocol, and processing, at a protocol entity associated with the end-to-end connection, the control information in accordance with the end-to-end protocol.

Paragraph 14. Access stratum infrastructure equipment for use in a wireless communications network, the wireless communications network comprising a core network, the access stratum infrastructure equipment and another access stratum infrastructure equipment, the access stratum infrastructure equipment connected to the core network and to the other access stratum infrastructure equipment, the other access stratum infrastructure equipment providing a wireless access interface, wherein the wireless access interface is for the transmission of data to and the reception of data from a communications device, the access stratum infrastructure equipment comprising a network interface configured to transmit signals to and receive signals from the other infrastructure equipment and to transmit signals to and receive signals from the core network, and a controller, configured to control the network interface so that the access stratum infrastructure equipment is operable: to receive downlink data for transmission to the communications device via the wireless access interface from the core network, to determine that the downlink data comprises a positive acknowledgement indication generated in accordance with an end-to-end protocol providing reliable, in-order delivery of data, the positive acknowledgement indication indicating that uplink data transmitted by the communications device has been successfully received at an endpoint, the downlink data associated with an end-to-end connection between the communications device and the endpoint, and in response to determining that the downlink data comprises the positive acknowledgement indication, to discard the downlink data.

Paragraph 15. Circuitry for an access stratum infrastructure equipment for use in a wireless communications network, the wireless communications network comprising a core network, the access stratum infrastructure equipment and another access stratum infrastructure equipment, the access stratum infrastructure equipment connected to the core network and to the other access stratum infrastructure equipment, the other access stratum infrastructure equipment providing a wireless access interface, wherein the wireless access interface is for the transmission of data to and the reception of data from a communications device, the circuitry comprising network interface circuitry configured to transmit signals to and receive signals from the other infrastructure equipment and to transmit signals to and receive signals from the core network, and controller circuitry, configured to control the network interface so that the access stratum infrastructure equipment is operable: to receive downlink data for transmission to the communications device via the wireless access interface from the core network, to determine that the downlink data comprises a positive acknowledgement indication generated in accordance with an end-to-end protocol providing reliable, in-order delivery of data, the positive acknowledgement indication indicating that uplink data transmitted by the communications device has been successfully received at an endpoint, the downlink data associated with an end-to-end connection between the communications device and the endpoint, and in response to determining that the downlink data comprises the positive acknowledgement indication, to discard the downlink data.

Paragraph 16. A communications device for use in a wireless communications network, the wireless communications network comprising a first access stratum infrastructure equipment connected to a core network, and a second access stratum equipment providing a wireless access interface and connected to the first access stratum infrastructure equipment, the communications device comprising a transmitter configured to transmit uplink data associated with an end-to-end connection via the wireless access interface, the uplink data having as a destination an endpoint, a receiver configured to receive signals, and a controller configured to control the transmitter and the receiver so that the communications device is operable: to determine an estimated maximum round-trip time, the maximum round trip time comprising a total time from the transmission of data by the communications device using the end-to-end connection to the reception by the communications device of an acknowledgement indication transmitted by the endpoint in response to receiving the data, to transmit via the wireless access interface the uplink data in accordance with an end-to-end protocol providing reliable, in-order delivery of data, wherein the end-to-end connection was established in accordance with the end-to-end protocol, to determine that the estimated maximum round-trip time has passed since transmitting the data, in response to determining that the estimated maximum round-trip time has passed since transmitting the data, to update stored state information associated with the end-to-end connection to indicate that the uplink data has been successfully received at the endpoint, and to transmit second uplink data associated with the end-to-end connection in accordance with the end-to-end protocol and the updated stored state information.

Paragraph 17. Circuitry for a communications device for use in a wireless communications network, the wireless communications network comprising a first access stratum infrastructure equipment connected to a core network, and a second access stratum equipment providing a wireless access interface and connected to the first access stratum infrastructure equipment, the circuitry comprising transmitter circuitry configured to transmit uplink data associated with an end-to-end connection via the wireless access interface, the uplink data having as a destination an endpoint of the end-to-end connection, receiver circuitry configured to receive signals, and controller circuitry configured to control the transmitter circuitry and the receiver circuitry so that the communications device is operable: to determine an estimated maximum round-trip time, the maximum round trip time comprising a total time from the transmission of data by the communications device using the end-to-end connection to the reception by the communications device of an acknowledgement indication transmitted by the endpoint in response to receiving the data, to transmit via the wireless access interface the uplink data in accordance with an end-to-end protocol providing reliable, in-order delivery of data, wherein the end-to-end connection was established in accordance with the end-to-end protocol, to determine that the estimated maximum round-trip time has passed since transmitting the data, in response to determining that the estimated maximum round-trip time has passed since transmitting the data, to update stored state information associated with the end-to-end connection to indicate that the uplink data has been successfully received at the endpoint, and to transmit second uplink data associated with the end-to-end connection in accordance with the end-to-end protocol and the updated stored state information.

Paragraph 18. A method according to any of paragraphs 1 to 17, wherein the end-to-end protocol is a transmission control protocol (TCP).

Paragraph 19. A method according to any of paragraphs 1 to 17, wherein the end-to-end protocol is a Quick User Datagram Protocol (UDP) Internet Connections (QUIC) protocol.

Further particular and preferred aspects of the present invention are set out in the accompanying independent and dependent claims. It will be appreciated that features of the dependent claims may be combined with features of the independent claims in combinations other than those explicitly set out in the claims.

REFERENCES

[1] RP-182090, "Revised SID: Study on NR Industrial Internet of Things (IoT)," 3GPP RAN #81.
[2] Holma H. and Toskala A, "LTE for UMTS OFDMA and SC-FDMA based radio access", John Wiley and Sons, 2009
[3] 3GPP TS 38.321, "Medium Access Control (MAC) protocol specification (Rel-15)", v15.3.0
[4] Transmission Control Protocol, RFC 793
[5] 3GPP document R2-1703514 "Prioritizing TCP ACK transmission", LG Electronics, 3GPP RAN WG2 #97bis
[6] 3GPP document R2-1703311 "Potential hurdle in maximising DL TCP throughput", NTT Docomo, Fujitsu, 3GPP RAN WG2 #97bis
[7] Internet draft RFC 1122 "Requirements for Internet Hosts—Communication Layers"

What is claimed is:

1. A method of receiving downlink data associated with an end-to-end connection between a communications device and an endpoint by an access stratum infrastructure equipment in a wireless communications network, the wireless communications network comprising a core network, the access stratum infrastructure equipment and another access stratum infrastructure equipment, the access stratum infrastructure equipment connected to the core network and to the other access stratum infrastructure equipment, the other access stratum infrastructure equipment providing a wireless access interface, wherein the wireless access interface is for the transmission of data to and the reception of data from the communications device and the downlink data is for transmission to the communications device, the method comprising:

receiving the downlink data from the core network, determining that the downlink data corresponds to an end-to-end protocol providing reliable, in-order delivery of data, determining that the downlink data comprises a positive acknowledgement indication generated by the endpoint, the positive acknowledgement indication indicating that uplink data associated with the end-to-end connection transmitted by the communications device has been successfully received at the endpoint, and in response to determining that the downlink data comprises the positive acknowledgement indication, discarding, by the access stratum infrastructure equipment, the downlink data and not forwarding the downlink data for transmission to the communications device, wherein both the access stratum infrastructure equipment and the other access stratum infrastructure equipment communicate with the communications device.

2. The method according to claim 1, wherein the downlink data does not comprise any data generated by an application or higher layer protocol which uses the end-to-end protocol to ensure reliable and in-order delivery of that data.

3. The method according to claim 1, the method comprising:

receiving from the other access stratum infrastructure equipment uplink data, the uplink data transmitted by the communications device, determining that the uplink data comprises a header generated in accordance with the end-to-end protocol and comprises a sequence number associated with the uplink data, and storing the sequence number associated with the uplink data.

4. The method according to claim 1, the method comprising:

receiving second downlink data from the core network, determining that the second downlink data comprises a negative acknowledgement indication generated in accordance with the end-to-end protocol indicating that at least a portion of uplink data transmitted by the communications device associated with the end-to-end connection has not been successfully received at the endpoint, and in response to determining that the second downlink data comprises a negative acknowledgement indication, forwarding the second downlink data to the other access stratum infrastructure equipment for transmission to the communications device.

5. The method according to claim 4, wherein the negative acknowledgement indication comprises a selective acknowledgement indicating that data associated with a range of sequence numbers has not been received.

6. The method according to claim 1, the method comprising:

receiving third downlink data from the core network, determining that the third downlink data comprises data which is associated with the end-to-end connection and is generated by an application or higher layer protocol which uses the end-to-end connection for the transmission of data, and based on the determining that the third downlink data comprises data which is associated with the end-to-end connection and is generated by an application or higher layer protocol which uses the end-to-end connection for the transmission of data, forwarding the third downlink data to the other access stratum infrastructure equipment for transmission to the communications device.

7. The method according to claim 1, the method comprising:

determining a round trip time between the communications device and the endpoint, the round trip time comprising a total time from the transmission of data by the communications device using the end-to-end connection to the reception by the communications device of an acknowledgement indication transmitted by the endpoint in response to receiving the data, and transmitting an indication of the determined round trip time to the other access stratum infrastructure equipment for transmission to the communications device.

8. The method according to claim 1, the method comprising:

receiving fourth downlink data from a core network, determining that the fourth downlink data comprises a positive acknowledgement indication generated in accordance with the end-to-end protocol associated with the end-to-end connection, and does not comprise data which is associated with the end-to-end connection and is generated by an application or higher layer protocol which uses the end-to-end connection for the transmission of data, determining that the fourth downlink data satisfies predetermined conditions for forwarding to the communications device, and in response to determining that the fourth downlink data satisfies the predetermined conditions, forwarding the fourth downlink data to the other access stratum infrastructure equipment for transmission to the communications device.

9. The method according to claim 8, wherein the fourth downlink data satisfies the predetermined conditions if a time period since a most recent downlink data associated with the end-to-end connection has been forwarded to the other access stratum infrastructure equipment for transmission to the communications device exceeds a predetermined time period.

10. The method according to claim 8, wherein the fourth downlink data satisfies the predetermined conditions if number of downlink data packets associated with the end-to-end connection discarded by the access stratum infrastructure equipment since a most recent downlink data associated with the end-to-end connection has been forwarded to the other access stratum infrastructure equipment for transmission to the communications device exceeds a predetermined maximum discard count threshold.

11. Access stratum infrastructure equipment for use in a wireless communications network, the wireless communications network comprising a core network, the access stratum infrastructure equipment and another access stratum infrastructure equipment, the access stratum infrastructure equipment connected to the core network and to the other access stratum infrastructure equipment, the other access stratum infrastructure equipment providing a wireless access interface, wherein the wireless access interface is for the transmission of data to and the reception of data from a communications device, the access stratum infrastructure equipment comprising:

a network interface configured to transmit signals to and receive signals from the other infrastructure equipment and to transmit signals to and receive signals from the core network, and a controller, configured to control the network interface so that the access stratum infrastructure equipment is configured:

to receive downlink data for transmission to the communications device via the wireless access interface from the core network, to determine that the downlink data corresponds to an end-to-end protocol providing reliable, in-order delivery of data, to an endpoint, to determine that the downlink data comprises a positive acknowledgement indication generated by the endpoint, the positive acknowledgement indication indicating that uplink data transmitted by the communications device has been successfully received at an endpoint, the downlink data associated with an end-to-end connection between the communications device and the endpoint, and in response to determining that the downlink data comprises the positive acknowledgement indication, to discard, at the access stratum infrastructure equipment, the downlink data and to not forward the downlink data for transmission to the communications device, wherein both the access stratum infrastructure equipment and the other access stratum infrastructure equipment communicate with the communications device.

12. A communications device for use in a wireless communications network, the wireless communications network comprising a first access stratum infrastructure equipment connected to a core network, and a second access stratum equipment providing a wireless access interface and connected to the first access stratum infrastructure equipment, the communications device comprising:

a transmitter configured to transmit uplink data associated with an end-to-end connection via the wireless access interface, the uplink data having as a destination an endpoint, a receiver configured to receive signals, and a controller configured to control the transmitter and the receiver so that the communications device is configured:

to determine that the transmitter is to transmit the uplink data in accordance with an end-to-end protocol providing reliable, in-order delivery of data, to determine an estimated maximum round-trip time, the maximum round trip time comprising a total time from the transmission of data by the communications device using the end-to-end connection to the reception by the communications device of an acknowledgement indication generated and transmitted by the endpoint in response to receiving the data, to transmit via the wireless access interface the uplink data in accordance with the end-to-end protocol providing reliable, in-order delivery of data, wherein the end-to-end connection was established in accordance with the end-to-end protocol, to determine that the estimated maximum round-trip time has passed since transmitting the uplink data without receiving downlink data indicating a positive acknowledgement of receipt of the uplink data, in response to determining that the estimated maximum round-trip time has passed since transmitting the data, to update stored state information associated with the end-to-end connection to indicate that the uplink data has been successfully received at the endpoint, and to transmit second uplink data associated with the end-to-end connection in accordance with the end-to-end protocol and the updated stored state information, wherein both the first access stratum infrastructure equipment and the second access stratum infrastructure equipment communicate with the communications device.

13. A method according to claim 1, wherein the end-to-end protocol is a transmission control protocol (TCP).

14. A method according to claim 1, wherein the end-to-end protocol is a Quick User Datagram Protocol (UDP) Internet Connections (QUIC) protocol.

15. The method according to claim 13, wherein the downlink data includes only TCP control data.

16. The communications device according to claim 12, wherein the processor determines the estimated maximum round-trip time based on past transmissions and receptions.

* * * * *